(12) United States Patent
Demura et al.

(10) Patent No.: US 8,261,533 B2
(45) Date of Patent: Sep. 11, 2012

(54) EXHAUST PURIFICATION APPARATUS OF INTERNAL COMBUSTION ENGINE

(75) Inventors: Takayuki Demura, Mishima (JP); Masakazu Yamamoto, Kariya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 715 days.

(21) Appl. No.: 12/514,091

(22) PCT Filed: Nov. 8, 2007

(86) PCT No.: PCT/JP2007/072233
§ 371 (c)(1),
(2), (4) Date: May 8, 2009

(87) PCT Pub. No.: WO2008/056826
PCT Pub. Date: May 15, 2008

(65) Prior Publication Data
US 2010/0037594 A1    Feb. 18, 2010

(30) Foreign Application Priority Data

Nov. 10, 2006   (JP) ................................. 2006-305666

(51) Int. Cl.
*F01N 3/00* (2006.01)

(52) U.S. Cl. ................ 60/285; 60/274; 60/276; 60/297; 60/299; 123/443

(58) Field of Classification Search .................... 60/274, 60/276, 285, 286, 297, 299; 123/443
See application file for complete search history.

(56) References Cited

U.S. PATENT DOCUMENTS

| | | | |
|---|---|---|---|
| 5,657,625 A * | 8/1997 | Koga et al. ...................... | 60/274 |
| 5,661,971 A | 9/1997 | Waschatz et al. | |
| 5,758,493 A * | 6/1998 | Asik et al. ...................... | 60/274 |
| 5,974,792 A | 11/1999 | Isobe | |
| 6,324,835 B1 | 12/2001 | Surnilla et al. | |
| 6,467,259 B1 * | 10/2002 | Surnilla et al. ................... | 60/285 |
| 6,799,421 B2 * | 10/2004 | Surnilla .......................... | 60/285 |
| 6,868,827 B2 * | 3/2005 | Surnilla .................... | 123/339.11 |
| 7,146,799 B2 * | 12/2006 | Bidner et al. ..................... | 60/285 |
| 7,377,104 B2 * | 5/2008 | Makki et al. ..................... | 60/286 |
| 2002/0038541 A1 | 4/2002 | Sumilla et al. | |
| 2003/0131588 A1 | 7/2003 | Schnaibel et al. | |
| 2006/0162321 A1 | 7/2006 | Zillmer et al. | |
| 2007/0289295 A1 | 12/2007 | Miyashita | |

FOREIGN PATENT DOCUMENTS

| | | |
|---|---|---|
| DE | 103 49 855 | 5/2005 |
| EP | 0 715 062 | 6/1996 |
| EP | 0 902 172 | 3/1999 |
| GB | 2 355 945 | 5/2001 |

(Continued)

*Primary Examiner* — Binh Q Tran

(74) *Attorney, Agent, or Firm* — Oblon, Spivak, McClelland, Maier & Neustadt, L.L.P.

(57) ABSTRACT

An internal combustion engine wherein exhaust gas from the cylinder groups (1, 2) is supplied to a common NOx storage catalyst (12). When the NOx storage catalyst (12) should release the SOx, the average air-fuel ratio of one cylinder group (1) is made rich and the average air-fuel ratio of the other cylinder group (2) is made lean. At this time, the air-fuel ratios of the cylinders (3) of one cylinder group (1) are made one target rich air-fuel ratio selected from two predetermined target rich air-fuel ratios, while the air-fuel ratios of the cylinders (3) of the other cylinder group (2) are made one target lean air-fuel ratio selected from two predetermined target lean air-fuel ratios.

13 Claims, 16 Drawing Sheets

FOREIGN PATENT DOCUMENTS

| | | |
|---|---|---|
| JP | 8 144816 | 6/1996 |
| JP | 8 189388 | 7/1996 |
| JP | 9 88663 | 3/1997 |
| WO | 01 59271 | 8/2001 |
| WO | 2004 076826 | 9/2004 |
| WO | 2007 023380 | 3/2007 |

* cited by examiner

Fig.2
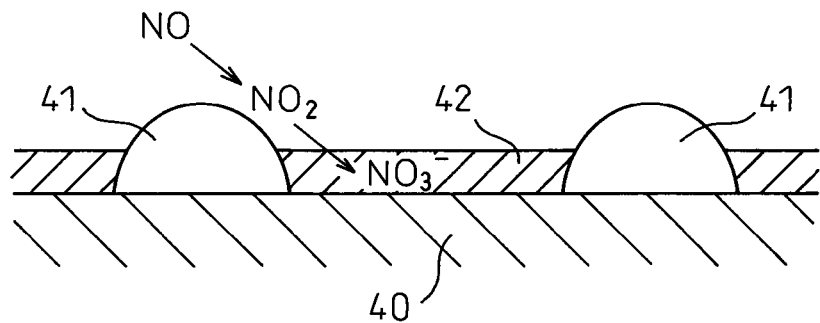
Fig.3
(A)
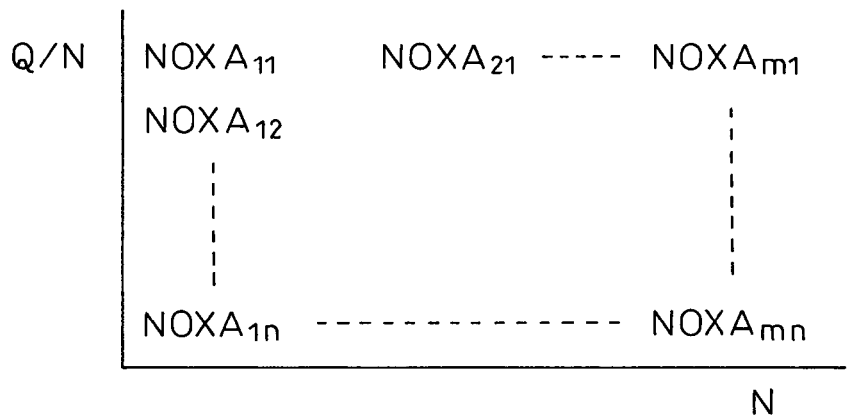
(B)
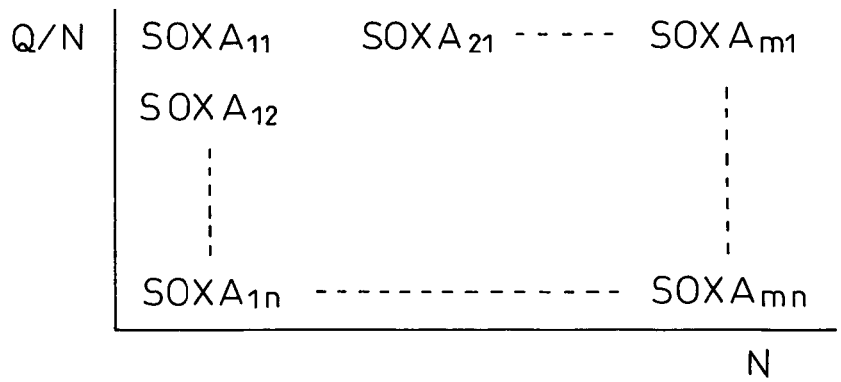

(A)

(B)

Fig.12
(A)
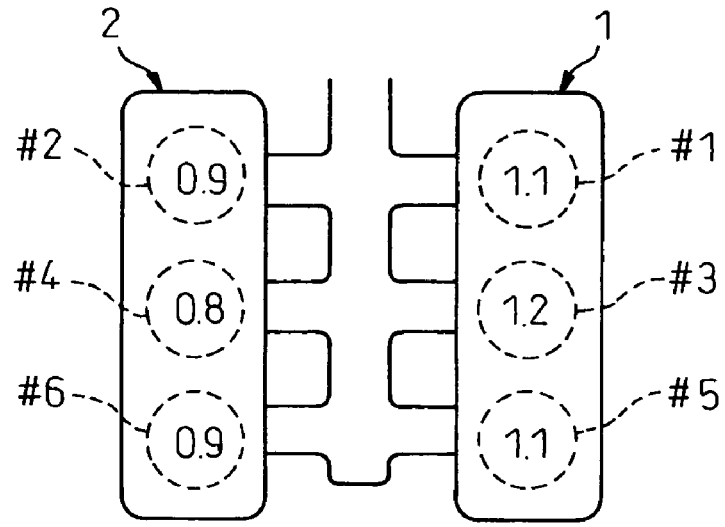
(B)
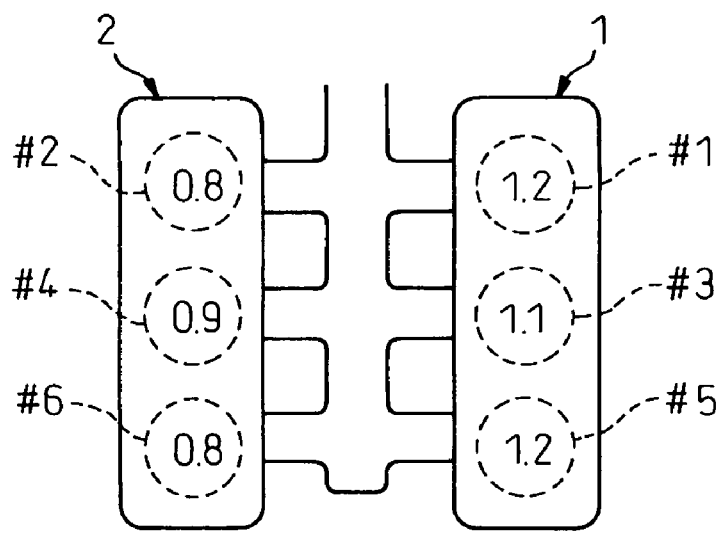

Fig.15

| NO. | #1 | #2 | #3 | #4 | #5 | #6 | #1 | #2 | #3 | #4 | #5 | #6 | AVERAGE OF FIRST CYLINDER GROUP | AVERAGE OF SECOND CYLINDER GROUP |
|---|---|---|---|---|---|---|---|---|---|---|---|---|---|---|
| 1 | 1.1 | 0.9 | 1.1 | 0.9 | 1.1 | 0.9 | 1.1 | 0.9 | 1.1 | 0.9 | 1.1 | 0.9 | 1.1 | 0.9 |
| 2 | 1.1 | 0.9 | 1.1 | 0.9 | 1.2 | 0.8 | 1.1 | 0.9 | 1.1 | 0.9 | 1.2 | 0.8 | 1.13 | 0.87 |
| 3 | 1.1 | 0.9 | 1.2 | 0.8 | 1.1 | 0.9 | 1.2 | 0.8 | 1.1 | 0.9 | 1.2 | 0.8 | 1.15 | 0.85 |
| 4 | 1.1 | 0.9 | 1.2 | 0.8 | 1.2 | 0.8 | 1.1 | 0.9 | 1.2 | 0.8 | 1.2 | 0.8 | 1.17 | 0.83 |
| 5 | 1.2 | 0.8 | 1.2 | 0.8 | 1.2 | 0.8 | 1.2 | 0.8 | 1.2 | 0.8 | 1.2 | 0.8 | 1.2 | 0.8 |

Fig. 21
(A)
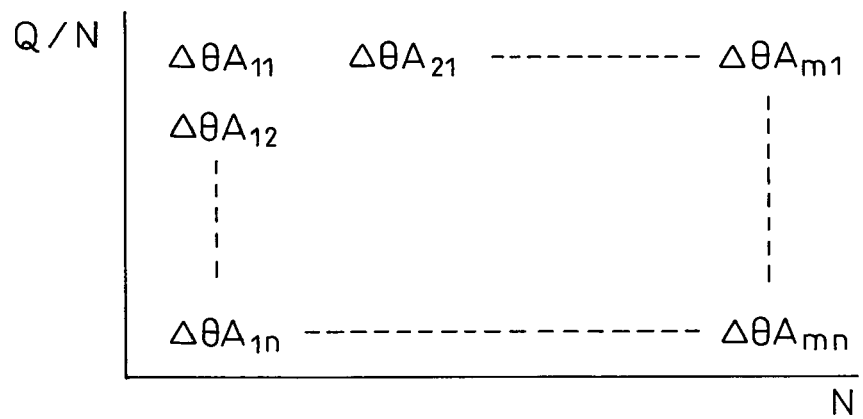
(B)
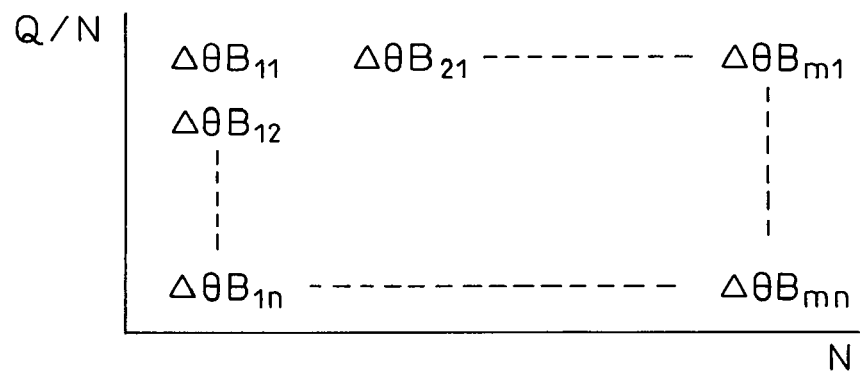
Fig. 22
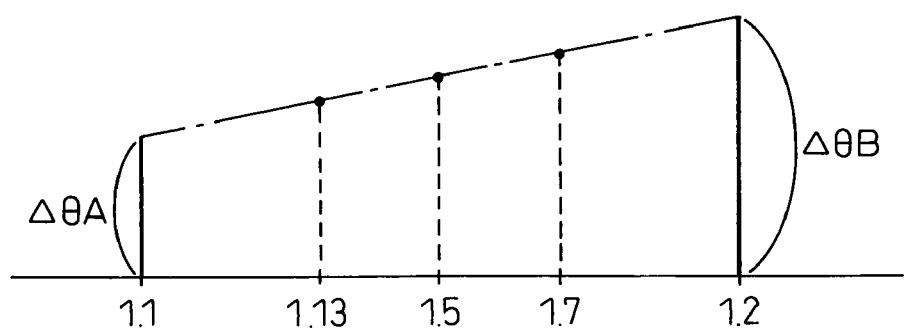

EXHAUST PURIFICATION APPARATUS OF INTERNAL COMBUSTION ENGINE

TECHNICAL FIELD

The present invention relates to an exhaust purification apparatus of an internal combustion engine.

BACKGROUND ART

Known in the art is an internal combustion engine providing, in an engine exhaust passage, an $NO_x$ storage catalyst storing $NO_x$ contained in exhaust gas when the air-fuel ratio of the inflowing exhaust gas is lean and releasing the stored $NO_x$ when the air-fuel ratio of the inflowing exhaust gas becomes the stoichiometric air-fuel ratio or rich, in which internal combustion engine the cylinders are divided into a first cylinder group and second cylinder group and an exhaust passage of the first cylinder group and an exhaust passage of the second cylinder group are merged and connected to a common $NO_x$ storage catalyst (for example, see Japanese Patent Publication (A) No. 8-189388). In this internal combustion engine, usually, in all cylinders, combustion is performed with a lean air-fuel ratio. The $NO_x$ produced at this time is stored in the $NO_x$ storage catalyst. On the other hand, if the $NO_x$ storage capacity of the $NO_x$ storage catalyst approaches saturation, the air-fuel ratio of the exhaust gas flowing into the $NO_x$ storage catalyst is made temporarily rich so as to release $NO_x$ from the $NO_x$ storage catalyst and reduce it.

In this regard, fuel and lubrication oil contain sulfur. Therefore, the exhaust gas includes $SO_x$. This $SO_x$ is stored together with the $NO_x$ in the $NO_x$ storage catalyst. However, this $SO_x$ is not released from the $NO_x$ storage catalyst just by making the air-fuel ratio of the exhaust gas rich, so the amount of $SO_x$ stored in the $NO_x$ storage catalyst gradually increases. As a result, the storable $NO_x$ amount ends up gradually decreasing. Therefore, when the $SO_x$ amount stored in the $NO_x$ storage catalyst increases, the $NO_x$ storage catalyst must be made to release the $SO_x$.

In this case, the $NO_x$ storage catalyst can be made to release the $SO_x$ if making the temperature of the $NO_x$ storage catalyst rise to the substantially 600° C. or more $SO_x$ release temperature and making the air-fuel ratio of the exhaust gas flowing into the $NO_x$ storage catalyst rich. However, in the above-mentioned internal combustion engine, if making the air-fuel ratio of each cylinder of the first cylinder group rich and making the air-fuel ratio of each cylinder of the second cylinder group lean, the large amount of unburned HC exhausted from the first cylinder group is oxidized by the excess oxygen exhausted from the second cylinder group in the $NO_x$ storage catalyst. The heat of oxidation reaction at this time may be used to raise the temperature of the $NO_x$ storage catalyst. At this time, if maintaining the amounts of unburned HC and the amounts of excess oxygen exhausted from the cylinder groups at the optimum amounts in accordance with the operating state of the engine, that is, if maintaining the rich degree of the first cylinder group and the lean degree of the second cylinder group at the optimum degrees in accordance with operating state of the engine, the temperature of the $NO_x$ storage catalyst can be maintained at the $SO_x$ release temperature.

Therefore, in the above-mentioned internal combustion engine, the rich degree of the first cylinder group and the lean degree of the second cylinder group required for maintaining the temperature of the $NO_x$ storage catalyst at the $SO_x$ release temperature are stored for each operating state of the engine. When $SO_x$ should be released from the $NO_x$ storage catalyst, the rich degree of the first cylinder group is made the stored rich degree in accordance with the operating state of the engine and the lean degree of the second cylinder group is made the stored lean degree in accordance with operating state of the engine.

However, when trying to make the rich degree of the first cylinder group and the lean degree of the second cylinder group the stored rich degree and lean degree corresponding to the operating state of the engine, the injection timing, ignition timing, etc. must be matched, so massive matching operations become necessary for each rich degree and lean degree set for each operating state of the engine. Therefore, as an actual problem, with this method, there is the problem that it is difficult to hold the temperature of the $NO_x$ storage catalyst at the $SO_x$ release temperature.

DISCLOSURE OF THE INVENTION

An object of the present invention is to provide an exhaust purification apparatus for an internal combustion engine which does not require massive work for compliance and which can maintain the temperature of a catalyst at a target temperature.

According to the present invention, there is provided an exhaust purification apparatus of an internal combustion engine, in which cylinders are divided into a pair of cylinder groups, exhaust gas exhausted from each cylinder group is exhausted to a common catalyst, and, when the catalyst should be held in a raised temperature state, an average air-fuel ratio of one cylinder group is made rich and an average air-fuel ratio of the other cylinder group is made lean so that an air-fuel ratio of the exhaust gas flowing into the catalyst becomes the substantially stoichiometric air-fuel ratio, wherein at least two different target air-fuel ratios are preset for each operating state of the engine for the air-fuel ratio of each cylinder of the one cylinder group when the average air-fuel ratio is to be made rich, at least two different target air-fuel ratios are preset for each operating state of the engine for the air-fuel ratio of each cylinder of the other cylinder group when the average air-fuel ratio is to be made lean, and the air-fuel ratio of each cylinder of the one cylinder group is made a target air-fuel ratio selected from the corresponding at least two target air-fuel ratios corresponding to the operating state of the engine and differing among at least part of the cylinders and the air-fuel ratio of each cylinder of the other cylinder group is made a target air-fuel ratio selected from the corresponding at least two target air-fuel ratios corresponding to the operating state of the engine and differing among at least part of the cylinders so that the temperature of the catalyst is made to become a predetermined target temperature.

BRIEF DESCRIPTION OF THE DRAWINGS

FIG. 2 is a cross-sectional view of the surface part of a catalyst carrier of a $NO_x$ storage catalyst.

FIG. 3 is a view of a map of a storage $NO_x$ amount NOXA etc.

FIG. 12 is a view of a rich degree and lean degree of each cylinder.

FIG. 15 is a view of a pattern of combination of air-fuel ratios of each cylinder.

FIG. 21 is a view of a map of a correction amount of a throttle valve opening degree.

FIG. 22 is a view for explaining the method of finding a correction amount of a throttle valve opening degree in accordance with a pattern of combination of air-fuel ratios.

BEST MODE FOR CARRYING OUT THE INVENTION

Figure 1:
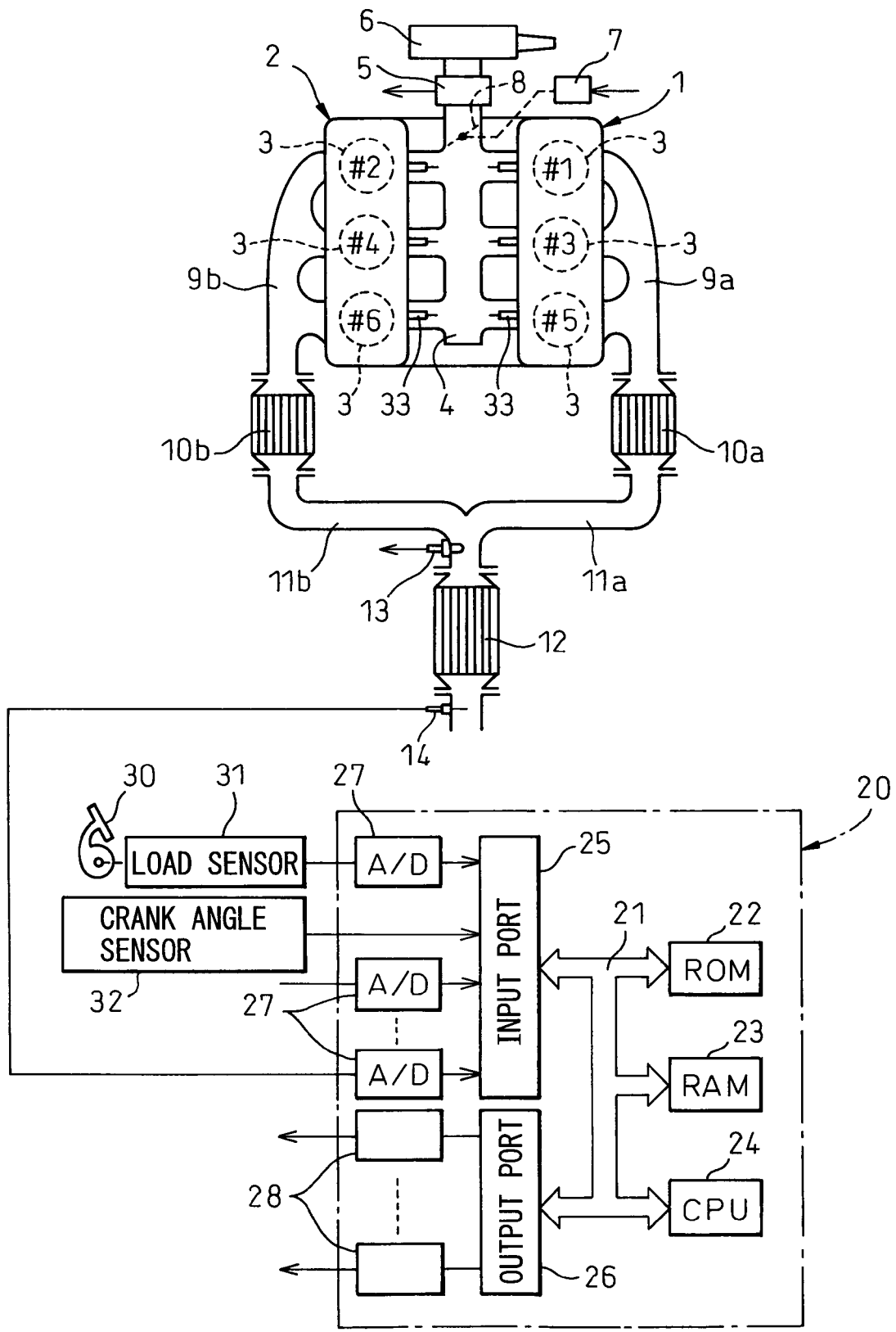
FIG. 1 is an overview of an internal combustion engine.

FIG. 1 shows the case of the present invention applied to a V-type six-cylinder spark ignition type internal combustion engine. Note that, it goes without say, the present invention can also be applied to an in-line six-cylinder internal combustion engine or other in-line type internal combustion engine and can also be applied to an internal combustion engine of other than six cylinders.

Referring to FIG. 1, one bank is formed with a first cylinder group 1 comprising the three cylinders 3 of every other position in the firing sequence, that is, the No. 1 cylinder #1, No. 3 cylinder #3, and No. 5 cylinder #5, while the other bank is formed with a second cylinder group 2 comprising the three cylinders 3 of every other position in the firing sequence, that is, the No. 2 cylinder #2, No. 4 cylinder #4, and No. 6 cylinder #6. The cylinders 3 of the first cylinder group 1 and second cylinder group 2 are connected to a common intake manifold 4. The inlet part of the intake manifold 4 is connected through an air flow meter 5 to an air cleaner 6. At the inlet part of the intake manifold 4, a throttle valve 8 controlled to open and close by an actuator 7 is arranged.

On the other hand, the cylinders #1, #3, #5 of the first cylinder group 1 are connected through a common first exhaust manifold 9a to an inlet part of a three-way catalyst 10a, while the cylinders #2, #4, #6 of the second cylinder group 2 are connected through a common second exhaust manifold 9b to an inlet part of a three-way catalyst 10b. The outlet part of the three-way catalyst 10a and the outlet part of the three-way catalyst 10b are connected through corresponding exhaust pipes 11a, 11b to the inlet part of a common catalyst 12 having an oxidation function. In the embodiment according to the present invention, this common catalyst 12 is comprised of a $NO_x$ storage catalyst.

An electronic control unit 20 is comprised of a digital computer provided with a ROM (read only memory) 22, RAM (random access memory) 23, CPU (microprocessor) 24, input port 25, and output port 26, which are connected with each other by a bidirectional bus 21. The inlet part and output part of the common catalyst, that is, the $NO_x$ storage catalyst 12, have an air-fuel ratio sensor 13 and a temperature sensor 14 arranged at it. The output signals of this air-fuel ratio sensor 13 and temperature sensor 14 are input through corresponding AD converters 27 to the input port 25.

An accelerator pedal 30 has a load sensor 31 generating an output voltage proportional to the amount of depression L of the accelerator pedal 30 connected to it. The output voltage of the load sensor 31 is input through the corresponding AD converter 27 to the input port 25. Further, the input port 25 has a crank angle sensor 32 generating an output pulse each time the crankshaft for example rotates by 30° connected to it. On the other hand, the output port 26 is connected through the corresponding drive circuits 28 to the fuel injectors 33 for injecting fuel to the actuator 7 of the throttle valve 8 and the cylinders #1 to #6.

Next, the $NO_x$ storage catalyst 12 will be explained. The base of the $NO_x$ storage catalyst 12 carries a catalyst carrier comprised of for example alumina. FIG. 2 schematically shows a cross-section of the surface part of this catalyst carrier 40. As shown in FIG. 2, the surface of the catalyst carrier 40 carries a precious metal catalyst 41 diffused on it. Further, the surface of the catalyst carrier 40 is formed with a layer of an $NO_x$ absorbent 42.

In an embodiment according to the present invention, as the precious metal catalyst 41, platinum Pt is used. As the ingredient forming the $NO_x$ absorbent 42, for example, at least one element selected from potassium K, sodium Na, cesium Cs, and other alkali metals, barium Ba, calcium Ca, and other alkali earths, lanthanum La, yttrium Y, and other rare earths is used.

If the ratio of the air and fuel supplied into the engine intake passage, combustion chamber, and exhaust passage upstream of the $NO_x$ storage catalyst 12 is denoted as the "air-fuel ratio of the exhaust gas", the $NO_x$ absorbent 42 absorbs the $NO_x$ when the air-fuel ratio of the exhaust gas is lean and releases the absorbed $NO_x$ when the oxygen concentration in the exhaust gas falls, that is, performs a $NO_x$ absorption and release action.

That is, if explaining this taking as an example the case of using barium Ba as the ingredient forming the $NO_x$ absorbent 42, when the air-fuel ratio of the exhaust gas is lean, that is, when the oxygen concentration in the exhaust gas is high, the NO contained in the exhaust gas, as shown in FIG. 2, is oxidized on the platinum Pt 41 and becomes $NO_2$. Next, this is absorbed in the $NO_x$ absorbent 42, bonds with the barium oxide BaO, and diffuses in the $NO_x$ absorbent 42 in the form of nitrate ions $NO_3^-$. In this way, the $NO_x$ is absorbed in the $NO_x$ absorbent. So long as the oxygen concentration in the exhaust gas is high, $NO_2$ is formed on the surface of the platinum Pt 41. So long as the $NO_x$ absorption capability of the $NO_x$ absorbent 42 is not saturated, the $NO_2$ is absorbed in the $NO_x$ absorbent 42 and nitrate ions $NO_3^-$ are generated.

As opposed to this, if the air-fuel ratio of the exhaust gas is made rich or the stoichiometric air-fuel ratio, the oxygen concentration in the exhaust gas falls, so the reaction proceeds in the opposite direction ($NO_3^- \rightarrow NO_2$) and therefore the nitrate ions $NO_3^-$ in the $NO_x$ absorbent 42 are released in the form of NO$_2$ from the NO$_x$ absorbent 42. Next, the released NO$_x$ is reduced by the unburned HC and the CO contained in the exhaust gas.

In this way, when the air-fuel ratio of the exhaust gas is lean, that is, when the combustion is performed under a lean air-fuel ratio, the NO$_x$ in the exhaust gas is absorbed in the NO$_x$ absorbent 42. However, if combustion under the lean air-fuel ratio continues, the NO$_x$ absorption capability of the NO$_x$ absorbent 42 eventually ends up becoming saturated and therefore the NO$_x$ absorbent 42 can no longer absorb NO$_x$. Therefore, in this embodiment according to the present invention, before the absorption capability of the NO$_x$ absorbent 42 becomes saturated, the air-fuel ratio of the exhaust gas is temporarily made rich, whereby the NO$_x$ absorbent 42 is made to release the NO$_x$.

However, exhaust gas contains SO$_x$, that is, SO$_2$. When this SO$_2$ flows into the NO$_x$ storage catalyst 12, this SO$_2$ is oxidized at the platinum Pt 41 and becomes SO$_3$. Next, this SO$_3$ is absorbed in the NO$_x$ absorbent 42, bonds with the barium oxide BaO, diffuses in the NO$_x$ absorbent 42 in the form of sulfate ions SO$_4^{2-}$, and forms the stable sulfate BaSO$_4$. However, the NO$_x$ absorbent 42 has a strong basicity, so this sulfate BaSO$_4$ is stable and hard to break down. With just making the air-fuel ratio of the exhaust gas rich, the sulfate BaSO$_4$ is hard to break down and remains as it is. Therefore, in the NO$_x$ absorbent 42, along with the elapse of time, the sulfate BaSO$_4$ increases and therefore the NO$_x$ amount which the NO$_x$ absorbent 42 can absorb falls, so when the amount of sulfate BaSO$_4$ in the NO$_x$ absorbent 42 increases, the NO$_x$ absorbent 42 must be made to release SO$_x$.

However, in this case, if making the air-fuel ratio of the exhaust gas flowing into the NO$_x$ storage catalyst 12 rich in the state with the temperature of the NO$_x$ storage catalyst 12 raised to the 600° C. or higher SO$_x$ release temperature, the SO$_x$ is released from the NO$_x$ absorbent 42. Therefore, when SO$_x$ should be released from the NO$_x$ absorbent 42, first, the temperature of the NO$_x$ storage catalyst 12 is raised to the SO$_x$ release temperature in temperature raising control of the NO$_x$ storage catalyst 12, then the temperature of the NO$_x$ storage catalyst 12 is held at the SO$_x$ release temperature and the air-fuel ratio of the exhaust gas flowing into the NO$_x$ storage catalyst 12 is made rich in SO$_x$ release control.

Figure 4:
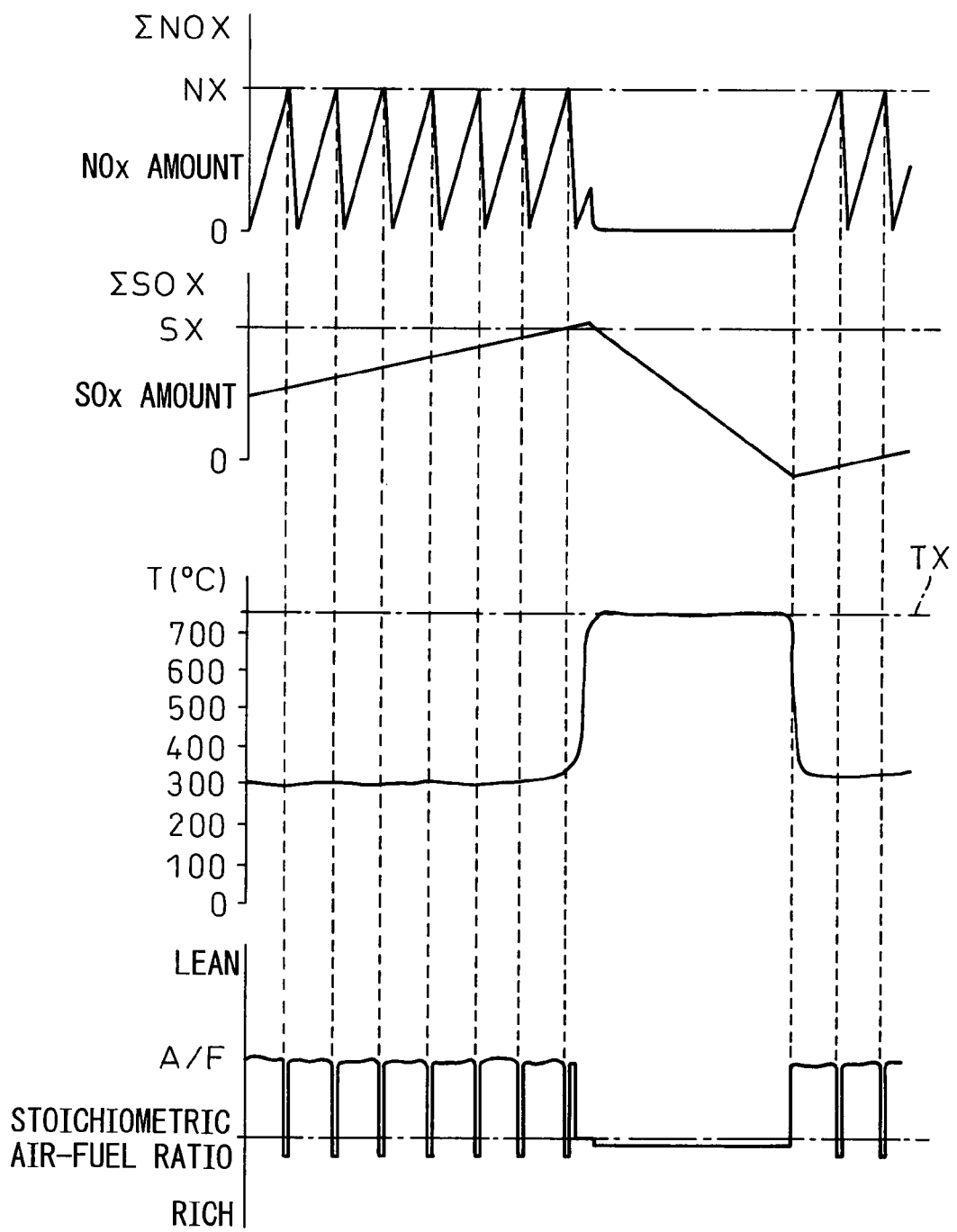
FIG. 4 is a time chart of $NO_x$ release control and $SO_x$ release control.

Next, while referring to FIG. 3 to FIG. 5, the NO$_x$ release control and SO$_x$ release control performed in the embodiment of the present invention will be explained in brief.

The NO$_x$ amount exhausted from the engine changes in accordance with the operating state of the engine. Therefore, the NO$_x$ amount absorbed in the NO$_x$ absorbent 42 also changes in accordance with the operating state of the engine. Therefore, in the embodiment according to the present invention, the NO$_x$ amount NOXA stored per unit time in the NO$_x$ storage catalyst 12 is stored as a function of the engine load Q/N and engine speed N in the form of the map shown in FIG. 3(A) in advance in the ROM 22. By cumulatively adding the NO$_x$ amount NOXA, the NO$_x$ amount ΣNOX stored in the NO$_x$ storage catalyst 12 is calculated. In the embodiment according to the present invention, as shown in FIG. 4, each time this NO$_x$ amount ΣNOX reaches the allowable value NX, the air-fuel ratio of the exhaust gas A/F flowing into the NO$_x$ storage catalyst 12 is temporarily made rich, whereby NO$_x$ is released from the NO$_x$ storage catalyst 12.

On the other hand, fuel contains sulfur in a certain ratio. Therefore, the SO$_x$ amount contained in the exhaust gas, that is, the SO$_x$ amount stored in the NO$_x$ storage catalyst 12, is proportional to the fuel injection amount. The fuel injection amount is a function of the engine load and engine speed, therefore the SO$_x$ amount stored in the NO$_x$ storage catalyst 12 also becomes a function of the engine load and engine speed. In the embodiment according to the present invention, the SO$_x$ amount SOXA stored per unit time in the NO$_x$ storage catalyst 12 is stored as a function of the engine load Q/N and engine speed N in the form of a map as shown in FIG. 3(B) in advance in the ROM 22. By cumulatively adding this SO$_x$ amount SOXA, the SO$_x$ amount ΣSOX stored in the NO$_x$ storage catalyst 12 is calculated. In the embodiment according to the present invention, as shown in FIG. 4, when this SO$_x$ amount ΣSOX has reached the allowable value SX, the temperature T of the NO$_x$ storage catalyst 12 is raised up to the SO$_x$ release target temperature TX. In the state with the temperature T of the NO$_x$ storage catalyst 12 held at the SO$_x$ release target temperature TX, the air-fuel ratio of the exhaust gas flowing into the NO$_x$ storage catalyst 12 is made rich.

Figure 5:
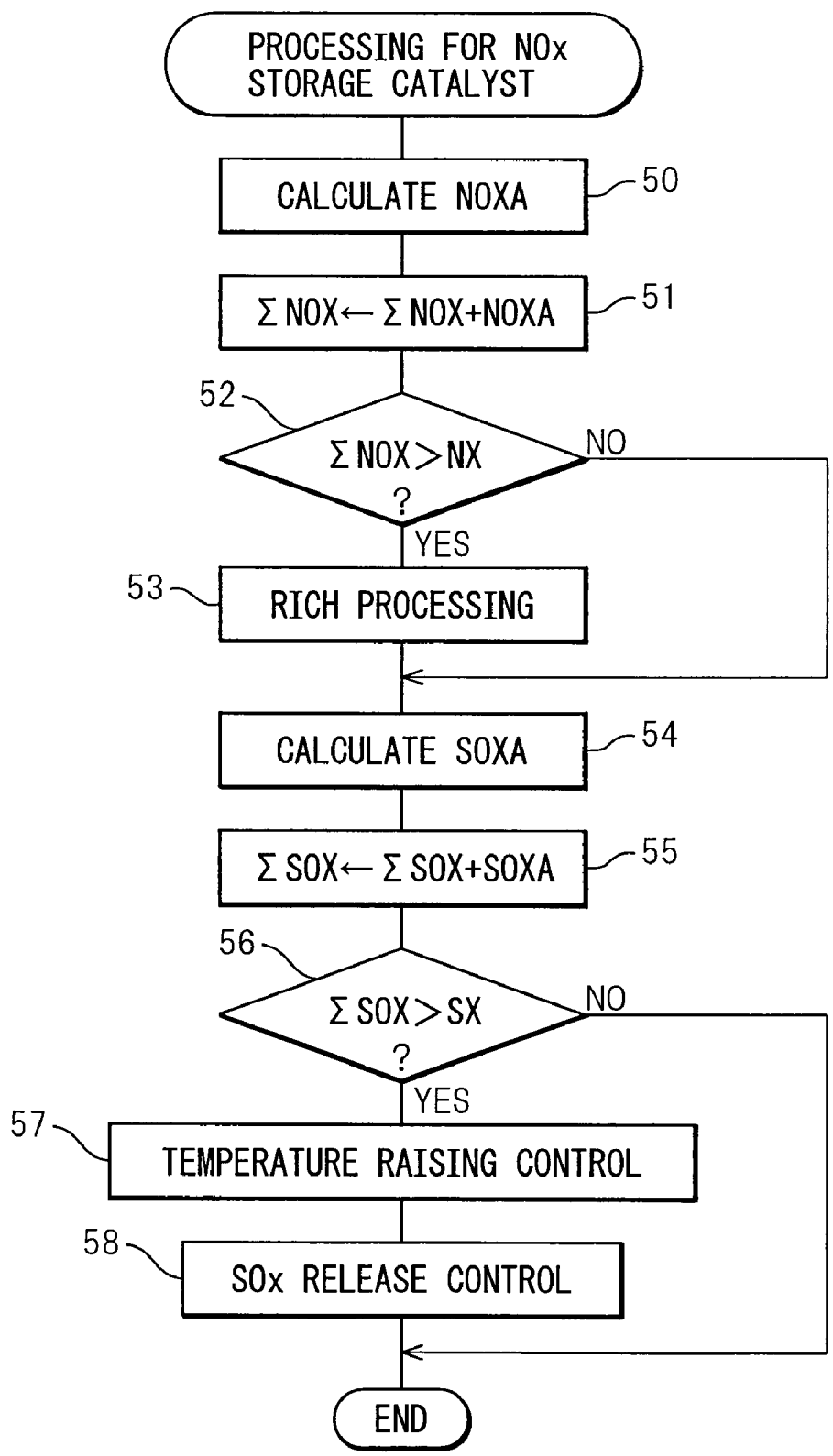
FIG. 5 is a flow chart for executing processing on a $NO_x$ storage catalyst.

FIG. 5 shows a processing routine for a NO$_x$ storage catalyst 12.

Referring to FIG. 5, first, at step 50, the NO$_x$ amount NOXA stored per unit time is calculated from the map shown in FIG. 3(A). Next, at step 51, this NOXA is added to the NO$_x$ amount ΣNOX stored in the NO$_x$ storage catalyst 12. Next, at step 52, whether the storage NO$_x$ amount ΣNOX is over an allowable value NX is judged. If ΣNOX>NX, the routine proceeds to step 53, where the fuel injection amount is increased, whereby rich processing is performed to temporarily change the air-fuel ratio of the exhaust gas flowing into the NO$_x$ storage catalyst 12 from lean to rich and the ΣNOX is cleared.

Next, at step 54, the SO$_x$ amount SOXA stored per unit time is calculated from the map shown in FIG. 3(B). Next, at step 55, this SOXA is added to the SO$_x$ amount ΣSOX stored in the NO$_x$ storage catalyst 12. Next, at step 56, whether the storage SO$_x$ amount ΣSOX has exceeded the allowable value SX is judged. When ΣSOX>SX, the routine proceeds to step 57, where the temperature T of the NO$_x$ storage catalyst 12 is raised to the SO$_x$ release target temperature TX in temperature raising control. Next, at step 58, the temperature of the NO$_x$ storage catalyst 12 is held at the SO$_x$ release target temperature TX and the air-fuel ratio of the exhaust gas flowing into the NO$_x$ storage catalyst 12 is made rich in SO$_x$ release control, then ΣSOX is cleared.

Now, in the embodiment according to the present invention, at the time of temperature raising control of the NO$_x$ storage catalyst 12 and at the time of SO$_x$ release control, the air-fuel ratio at each cylinder 3 is changed in various ways. To explain this, below, a view taking out and schematically showing only the first cylinder group 1 and second cylinder group 2 as shown in FIG. 6 will be used.

Figure 6:
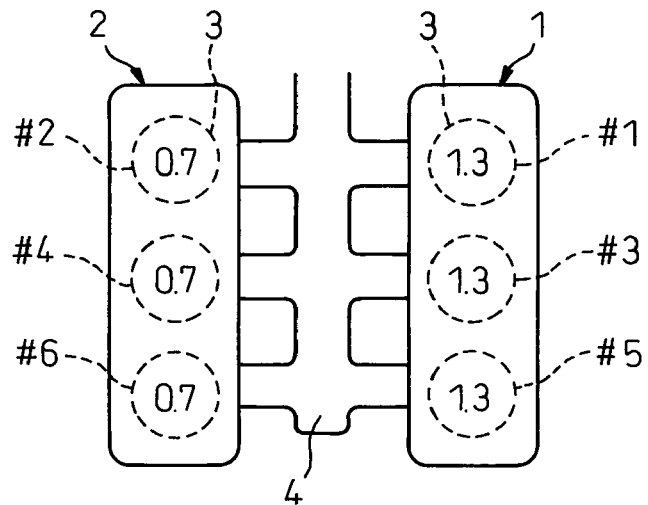
FIG. 6 is a view showing a rich degree and lean degree of each cylinder.

Note that in FIG. 6, for easy understanding of the invention, amounts of fuel when designating the amount of fuel at the stoichiometric air-fuel ratio as 1.0 are used to express the rich degree and lean degree at the cylinders #1 to #6. The larger the value compared with 1.0, the higher the rich degree, while the smaller the value compared with 1.0, the greater the lean degree.

Note that the relationship between the numerical values shown in the cylinders #1 to #6 and the air-fuel ratio is shown in the following table:

| Numerical value shown for cylinder | Air-fuel ratio |
|---|---|
| 1.3 | 11.2 |
| 0.7 | 20.7 |

Note that FIG. 6 shows the rich degree and lean degree of the cylinders #1 to #6 at the time of the temperature raising control of the $NO_x$ storage catalyst 12.

Figure 7:
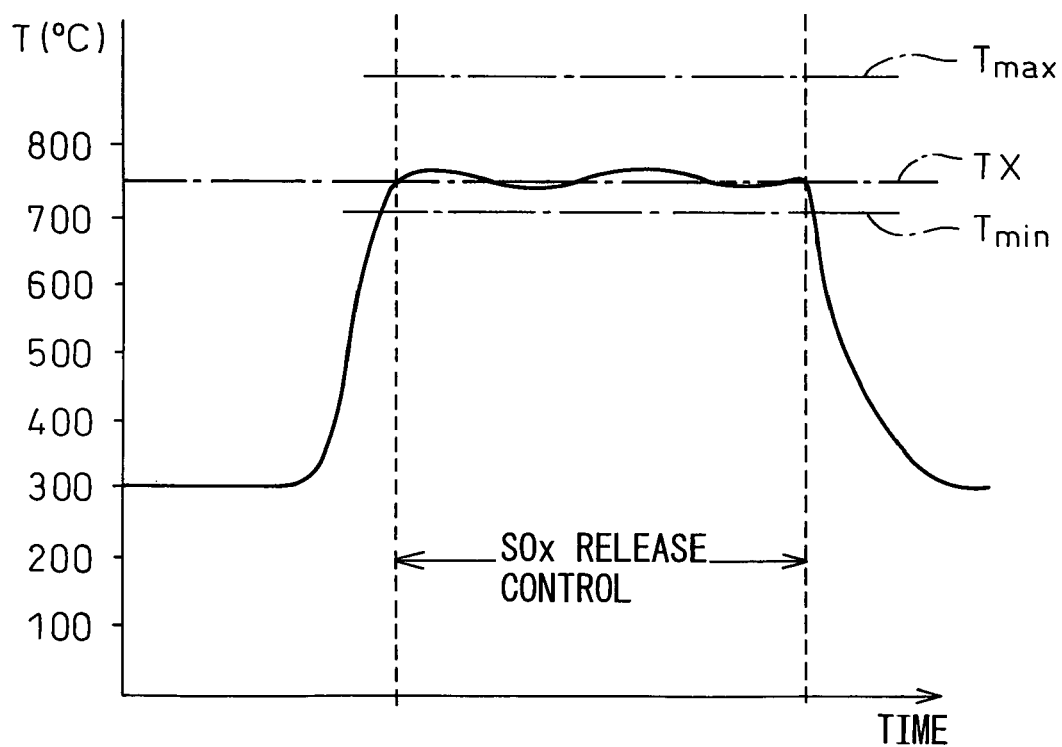
FIG. 7 is a time chart of $SO_x$ release control.
Figures 8, 9:
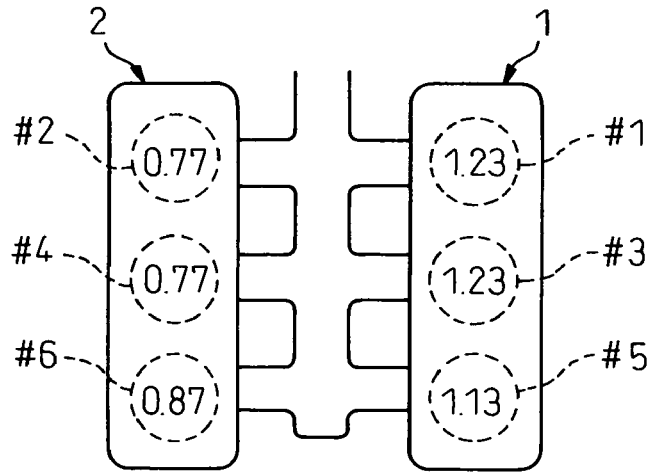
FIG. 8 is a view of a rich degree and lean degree of each cylinder.
FIG. 9 is a view of a map of a first target air-fuel ratio and second target air-fuel ratio.

FIG. 7 shows an embodiment of $SO_x$ release control according to the present invention performed after the temperature raising control of the $NO_x$ storage catalyst 12. In FIG. 7, the ordinate T shows the temperature of the $NO_x$ storage catalyst 12, while the abscissa shows the elapsed time. As shown in FIG. 7, when $SO_x$ release control is performed, the temperature T of the $NO_x$ storage catalyst 12 is held at the $SO_x$ release target temperature TX. An example of the rich degree and lean degree of the cylinders #1 to #6 at this time is shown in FIG. 8. Note that in the example shown in FIG. 8, the firing sequence is #1-#2-#3-#4-#5-#6.

Further, as will be understood from FIG. 8, in the embodiment according to the present invention, at the time of $NO_x$ release control, all cylinders #1, #3, and #5 of the first cylinder group 1 are made rich and the average air-fuel ratio of the first cylinder group 1 is made rich. Also, all cylinders #2, #4, #6 of the second cylinder group 2 are made lean and the average air-fuel ratio of the second cylinder group 2 is made lean. However, in this case, the air-fuel ratio of any cylinder of each of the cylinder groups 1 and 2 can be made the stoichiometric air-fuel ratio. Further, in the embodiment according to the present invention, at the cylinders of the first cylinder group 1 and the cylinders of the second cylinder group 2 next performing the combustion, that is, #1 and #2, #3 and #4, and #5 and #6, the air-fuel ratios are set so that the average air-fuel ratio becomes the stoichiometric air-fuel ratio, therefore the average of the average air-fuel ratio of the first cylinder group 1 and the average air-fuel ratio of the second cylinder group 2 becomes the stoichiometric air-fuel ratio.

However, as explained above, when making the $NO_x$ storage catalyst 12 release $SO_x$, it is necessary to raise the temperature T of the $NO_x$ storage catalyst 12 to the $SO_x$ release temperature and make the air-fuel ratio of the exhaust gas flowing into the $NO_x$ storage catalyst 12 rich. Explaining this a bit more accurately, if the air-fuel ratio at the surface of the $NO_x$ storage catalyst 12 becomes locally rich, the locally rich parts release $SO_x$, therefore to make the $NO_x$ storage catalyst 12 release $SO_x$, it is sufficient to make the air-fuel ratio at the surface of the $NO_x$ storage catalyst 12 locally rich.

Therefore, even when the exhaust gas flowing into the $NO_x$ storage catalyst 12 is held at the substantially stoichiometric air-fuel ratio, the air-fuel ratio on the surface of the $NO_x$ storage catalyst 12 usually becomes locally rich. When made repeatedly rich and lean so that the average air-fuel ratio becomes substantially the stoichiometric air-fuel ratio, the $NO_x$ storage catalyst 12 releases the $SO_x$ when rich. Therefore, even if the air-fuel ratio of the exhaust gas flowing into the $NO_x$ storage catalyst 12 is held at substantially the stoichiometric air-fuel ratio, the $NO_x$ storage catalyst 12 releases the SOX. However, to cause the $NO_x$ storage catalyst 12 to release the $SO_x$ in a short time, the exhaust gas flowing into the $NO_x$ storage catalyst 12 has to be held rich continuously.

Now, in the embodiment according to the present invention, as explained above FIG. 8, the average air-fuel ratio of one cylinder group, for example, the first cylinder group 1, is made rich, while the average air-fuel ratio of the other cylinder group, for example, the second cylinder group 2, is made lean. Further, in this case, in the present invention, at least two different target air-fuel ratios are set in advance for each operating state of the engine for the air-fuel ratio of each of the cylinders #1, #3, #5 of the first cylinder group 1 when the average air-fuel ratio is to be made rich, while at least two different target air-fuel ratios are set in advance for each operating state of the engine for the air-fuel ratio of each of the cylinders #2, #4, #6 of the second cylinder group 2 when the average air-fuel ratio is to be made lean.

In this way, in the present invention, at least two different target air-fuel ratios are set in advance for each operating state of the engine for the air-fuel ratio of each cylinder of the cylinder groups 1, 2. Below, the present invention will be explained using as an example an embodiment of presetting two different target air-fuel ratios for each operating state of the engine for the air-fuel ratio of each cylinder of the cylinder groups 1, 2.

FIGS. 9(A) and (B) shows the first target air-fuel ratio A and the second target air-fuel ratio B for the first cylinder group 1. These first target air-fuel ratio A and second target air-fuel ratio B are for example stored as functions of the engine load Q/N (intake air amount Q/engine speed N) and engine speed N in the form of maps in advance in the ROM 22. Note that these target air-fuel ratios A, B are stored in the form of numerical values showing the rich degree or lean degree such as shown in FIG. 6 and FIG. 8.

On the other hand, the first target air-fuel ratio and second target air-fuel ratio for the second cylinder group 2 can be stored in advance in the form of maps as shown in FIG. 9. However, in the embodiment according to the present invention, the first target air-fuel ratio and second target air-fuel ratio for the second cylinder group 2 are found from the first target air-fuel ratio A and second target air-fuel ratio B for the first cylinder group 1, so the first target air-fuel ratio and second target air-fuel ratio for the second cylinder group 2 are not particularly stored.

In the embodiment shown in FIGS. 9(A) and (B), the first target air-fuel ratio A is made an air-fuel ratio larger than the second target air-fuel ratio B. The first target air-fuel ratio A and second target air-fuel ratio B corresponding to each engine load Q/N and each engine speed N are calculated by interpolation from the maps shown in FIGS. 9(A) and (B).

In this case, in the present invention, the air-fuel ratios of the cylinders #1, #3, #5 of the first cylinder group 1 are made the air-fuel ratios of either of the first target air-fuel ratio A or the second target air-fuel ratio B found by interpolation. In the example shown in FIG. 8, the air-fuel ratio of the cylinder #5 is made the first target air-fuel ratio A, and those of the cylinders #1 and #3 are made the second target air-fuel ratio B.

On the other hand, as explained above, the air-fuel ratios of the cylinders #2, #4, #6 of the second cylinder group 2 are set so that, as shown in FIG. 8, the average value of the cylinders #1 and #2, the average value of the cylinders #3 and #4, and the average value of the cylinders #5 and #6 become the stoichiometric air-fuel ratio. If the first target air-fuel ratio A and second target air-fuel ratio B for the first cylinder group 1 are determined in this way, the air-fuel ratios of the cylinders of the second cylinder group 2 are determined, so as shown in FIGS. 9(A) and (B), in the embodiment according to the present invention, only the first target air-fuel ratio A and second target air-fuel ratio B for the first cylinder group 1 are stored.

Now, in FIG. 8, the sum of the parts exceeding 1.0 in the numerical values of the cylinders #1, #3, #5 of the first cylinder group 1 (0.23+0.23+0.13) expresses the amount of unburned HC exhausted from first cylinder group 1, while the sum of the parts falling short of 1.0 in the numerical values of the cylinders #2, #4, #6 of the second cylinder group 2 (0.23+ 0.23+0.13) expresses the amount of excess oxygen exhausted from the second cylinder group 2. Therefore, the larger the value of these sums, the larger the amount of generation of heat of oxidation reaction and therefore the higher the temperature T of the $NO_x$ storage catalyst 12.

Returning again to FIG. 7, FIG. 7 shows the two convergence temperatures Tmin and Tmax to which the temperature T of the $NO_x$ storage catalyst 12 finally converges when the engine is operated in the steady state under the same operating conditions. In the embodiment according to the present invention, the first target air-fuel ratio A in each operating state shown in FIG. 9(A) is set so that the convergence temperature becomes the convergence temperature Tmin shown in FIG. 7 when the engine is operating in the steady state where the air-fuel ratios of all cylinders of the first cylinder group 1 are made this first target air-fuel ratio and the air-fuel ratios of all cylinders of the second cylinder group 2 are made a lean air-fuel ratio of the same degree as the rich degree of the first target air-fuel ratio. The second target air-fuel ratio B in each operating state shown in FIG. 9(B) is set so that the convergence temperature becomes the convergence temperature Tmax shown in FIG. 7 when the engine is operating in the steady state where the air-fuel ratios of all cylinders of the first cylinder group 1 are made this second target air-fuel ratio and the air-fuel ratios of all cylinders of the second cylinder group 2 are made a lean air-fuel ratio of the same degree as the rich degree of the second target air-fuel ratio.

That is, when the engine is operating in the steady state, if the air-fuel ratio of each cylinder is set based on FIG. 9(A), the temperature T of the $NO_x$ storage catalyst 12 finally becomes the convergence temperature Tmin, while if the air-fuel ratio of each cylinder is set based on FIG. 9(B), the temperature T of the $NO_x$ storage catalyst 12 finally becomes the convergence temperature Tmax. In the embodiment according to the present invention, the convergence temperature Tmin is made the $SO_x$ release target temperature TX or a temperature just slightly lower than the $SO_x$ release target temperature TX, while the convergence temperature Tmax is made the convergence temperature when the air-fuel ratio of each cylinder of the first cylinder group 1 is made the allowable minimum rich air-fuel ratio or when the air-fuel ratio of each cylinder of the second cylinder group 2 is made the allowable maximum lean air-fuel ratio.

Next, the method of $SO_x$ release control by the present invention will be explained with reference to the specific example shown in FIG. 10 to FIG. 15. In this specific example, the explanation is given of the case where when the $SO_x$ release control is being performed in a certain operating state, the first target air-fuel ratio A for the first cylinder group 1 at this time is 1.1 in terms of the numerical value showing the rich degree while the second target air-fuel ratio B for the first cylinder group 1 is 1.2 in terms of the numerical value showing the rich degree.

Figure 10:
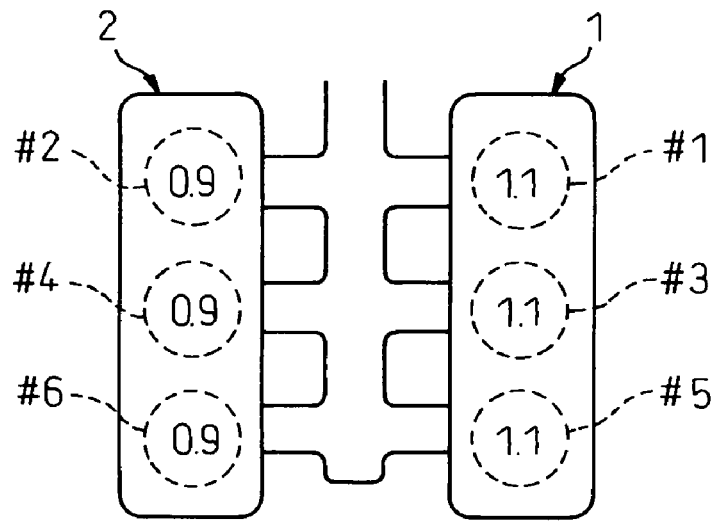
FIG. 10 is a view of a rich degree and lean degree of each cylinder.

FIG. 10 shows the case where all cylinders of the first cylinder group 1 are made the first target air-fuel ratio A, that is, 1.1. At this time, the average value of the numerical values of the cylinders #1, #3, #5 of the first cylinder group 1 is a small 1.1, therefore the heat of oxidation reaction of the unburned HC exhausted from the first cylinder group 1 is relatively low. At this time, if the engine is operated steadily, the temperature T of the $NO_x$ storage catalyst 12 converges to the convergence temperature Tmin shown in FIG. 7. The changes in the numerical values of the cylinders in accordance with the firing sequence and the average values of the numerical values of the cylinder groups 1 and 2 are shown in No. 1 of FIG. 15.

Figure 14:
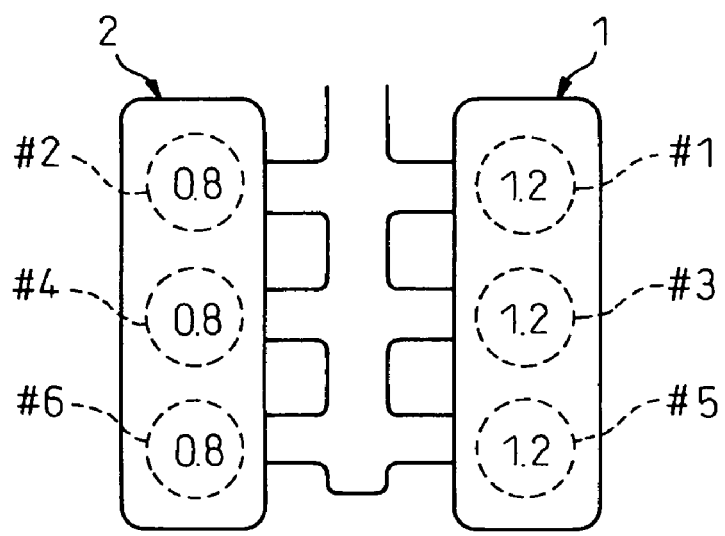
FIG. 14 is a view of a rich degree and lean degree of each cylinder.

On the other hand, FIG. 14 shows the case where all cylinders of the first cylinder group 1 are made the second target air-fuel ratio B, that is, 1.2. At this time, the average value of the cylinders #1, #3, #5 of the first cylinder group 1 is a large 1.2, therefore the heat of oxidation reaction of the unburned HC exhausted from the first cylinder group 1 is high. At this time, if the engine is operated steadily, the temperature T of the $NO_x$ storage catalyst 12 converges to the convergence temperature Tmax shown in FIG. 7. The changes in the numerical values of the cylinders in accordance with the firing sequence and the average values of the numerical values of the cylinder groups 1 and 2 are shown in No. 5 of FIG. 15.

Figure 11:
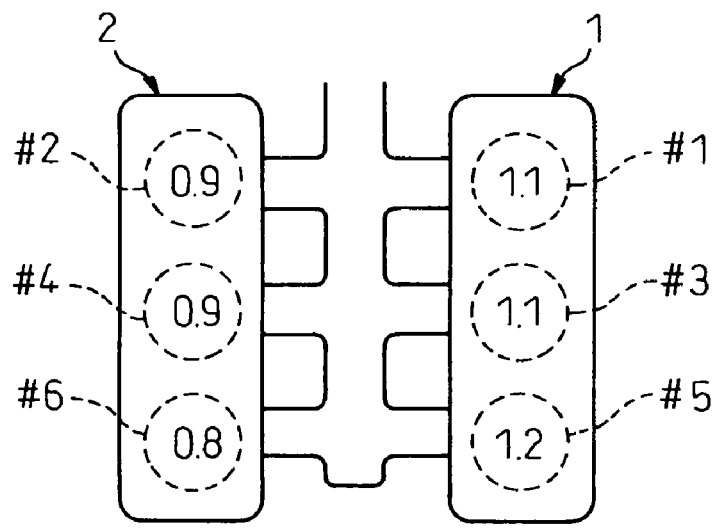
FIG. 11 is a view of a rich degree and lean degree of each cylinder.
Figure 13:
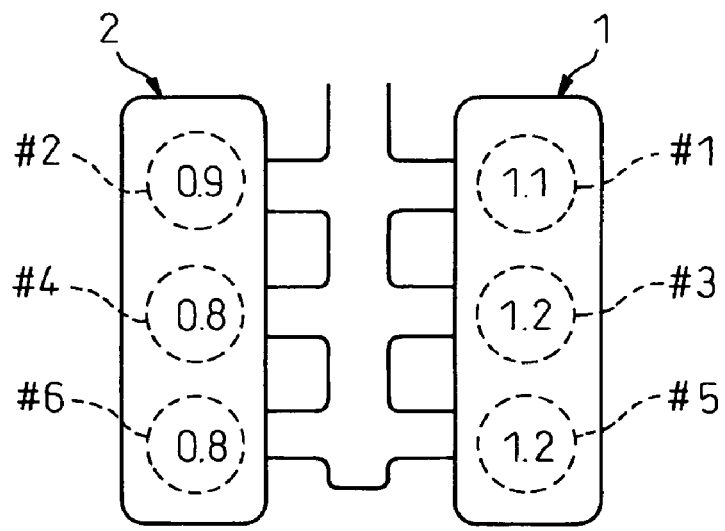
FIG. 13 is a view of a rich degree and lean degree of each cylinder.

On the other hand, in the example shown in FIG. 11 to FIG. 13, unlike the example shown in FIG. 10 and FIG. 14, the air-fuel ratios of part of the cylinders of the first cylinder group 1 are made the first target air-fuel ratio, that is, 1.1, while the air-fuel ratios of the remaining cylinders of the first cylinder group 1 are made the second target air-fuel ratio, that is, 1.2. In this case, as shown from FIG. 11 to FIG. 13, there are sets of combustion operations consecutively performed by cylinders of the first cylinder group 1 and cylinders of the second cylinder group 2, for example, a first set of combustion operations comprising combustion at the first target rich air-fuel ratio in the first cylinder group 1, that is, 1.1, and combustion at the first target lean air-fuel ratio in the second cylinder group 2, that is, 0.9, and a second set of combustion operations comprising combustion at the second target rich air-fuel ratio at the first cylinder group 1, that is, 1.2, and combustion at the second target lean air-fuel ratio at the second cylinder group 2, that is, 0.8.

First, referring to FIG. 11, FIG. 11 shows the case where the two cylinders #1 and #3 of the first cylinder group 1 are made the first target air-fuel ratio, that is, 1.1, and the one cylinder #5 of the first cylinder group 1 is made the second target air-fuel ratio, that is, 1.2. The changes in numerical values of the cylinders in accordance with the firing sequence at this time and the average values of the numerical values of the cylinder groups 1 and 2 are shown in No. 2 of FIG. 15. As will be understood from FIG. 15, at this time, each time the first set of combustion operations is performed two times, the second set of combustion operations is performed once.

On the other hand, at this time, the average value of the numerical values of the cylinders #1, #3, #5 of the first cylinder group 1 is 1.13 or somewhat larger than the case of No. 1, therefore the heat of oxidation reaction of the unburned HC exhausted from the first cylinder group 1 is also somewhat higher than the case of No. 1. Therefore, when the engine is operated in the steady state at this time, the temperature T of the $NO_x$ storage catalyst 12 converges to a temperature somewhat higher than the convergence temperature Tmin shown in FIG. 7.

FIG. 12 shows the case where the combustion shown by (A) and the combustion shown by (B) are alternately repeated. FIG. 11 shows the case where the two cylinders #1 and #3 of the first cylinder group 1 are made the first target air-fuel ratio, that is, 1.1, and the one cylinder #5 of the first cylinder group 1 is made the second target air-fuel ratio, that is, 1.2. That is, in FIG. 12, in the first cylinder group 1, for each cylinder where combustion is performed, the first target air-fuel ratio, that is, 1.1, and the second target air-fuel ratio, that is, 1.2, are alternately switched. The changes in numerical values of the cylinders in accordance with the firing sequence at this time and the average values of the numerical values of the cylinder groups 1 and 2 are shown in No. 3 of FIG. 15. As will be understood from FIG. 15, at this time, each time the first set of combustion operations is performed once, the second set of combustion operations is performed once.

At this time, the average value of the numerical values of the cylinders #1, #3, #5 of the first cylinder group 1 is 1.15 or between the case of No. 1 and the case of No. 5, therefore the heat of oxidation reaction of the unburned HC exhausted from the first cylinder group 1 becomes between the case of No. 1 and the case of No. 5. If the engine is operated steadily at this time, the temperature T of the $NO_x$ storage catalyst 12 converts to a temperature between the convergence temperatures Tmin and Tmax shown in FIG. 7.

FIG. 13 shows the case where one cylinder #1 of the first cylinder group 1 is made the first target air-fuel ratio, that is, 1.1, while the two cylinders #3 and #5 of the first cylinder group 1 are made the second target air-fuel ratio, that is, 1.2. The changes of the numerical values of the cylinders in accordance with the firing sequence at this time and the average values of the numerical values of the cylinder groups 1 and 2 are shown in No. 4 of FIG. 15. As shown in FIG. 15, at this time, each time the second set of combustion operations is performed two times, the first set of combustion operations is performed one time.

At this time, the average value of the numerical values of the cylinders #1, #3, #5 of the first cylinder group 1 is 1.17 or higher than the case of No. 3, therefore the heat of oxidation reaction of the unburned HC exhausted from the first cylinder group 1 becomes higher than the case of No. 3. Therefore, if the engine is operated in the steady state at this time, the temperature T of the $NO_x$ storage catalyst 12 converges to a somewhat lower temperature than the convergence temperature Tmax shown in FIG. 7.

The patterns of combinations of the air-fuel ratios of the cylinders shown from FIG. 10 to FIG. 14 are set, as will be understood from FIG. 15, so that the numerical values showing the average air-fuel ratios of the first cylinder group 1 increase in stages, that is, so that the amounts of heat of oxidation reaction generated increase in stages. The patterns of combinations of air-fuel ratios of cylinders shown from FIG. 10 to FIG. 14 are patterns of combinations at the time of a certain operating state of the engine. These patterns of combinations change in accordance with the operating state of the engine.

That is, as explained above, in the embodiment according to the present invention, there is a first set of combustion operations comprising consecutively performed combustion at a first target rich air-fuel ratio A and combustion at a first target lean air-fuel ratio and a second set of combustion operations comprising consecutively performed combustion at a second target rich air-fuel ratio B and combustion at a second target lean air-fuel ratio. The frequency of this first set of combustion operations and the frequency of the second set of combustion operations are changed in accordance with the operating state of the engine. As a result, the pattern of combination of air-fuel ratios is changed in accordance with the operating state of the engine.

Specifically speaking, in the embodiment according to the present invention, each time the first set of combustion operations is performed one time, two times . . . and C times (C is a positive integer), switching to the second set of combustion operations is allowed, while each time the second set of combustion operations is performed one time, two times . . . C times, switching to the first set of combustion operations is allowed. The number of this C is made smaller the lower the engine speed.

That is, when the engine is operating at a low speed, each time the first set of combustion operations is performed one time, the second set of combustion operations is performed one time, while each time the second set of combustion operations is performed one time, the first set of combustion operations is allowed to be performed one time. That is, the first set of combustion operations and the second set of combustion operations are only allowed to be performed alternately.

On the other hand, when the engine is operating at a medium speed, not only are the first set of combustion operations and the second set of combustion operations allowed to be alternately performed such as when the engine is operating at a low speed, but also each time the first set of combustion operations is performed two times, the second set of combustion operations is performed one time and each time the second set of combustion operations is performed two times, the first set of combustion operations is allowed to be performed one time. This case is shown from FIG. 10 to FIG. 15.

Figure 16:
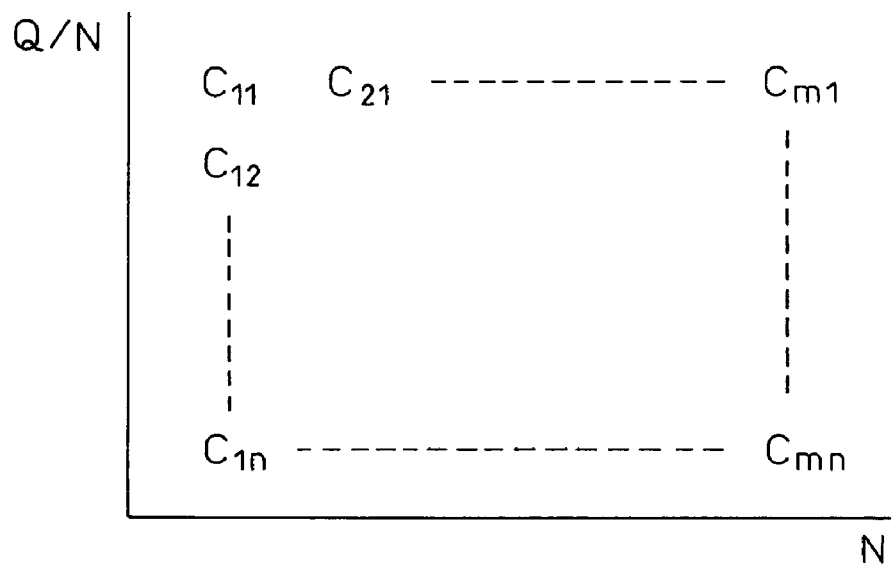
FIG. 16 is a view of a map of a number of switching permits C.

On the other hand, when the engine is operating at a high speed, in addition to the pattern of combination of air-fuel ratios when the engine is operating at a medium speed, each time the first set of combustion operations is performed three times, the second set of combustion operations is performed one time and each time the second set of combustion operations is performed three times, the first set of combustion operations is allowed to be performed one time. Further, compared with the steady state operation region, in the accelerated operation region, the above-mentioned number of switching permits C can be made larger. This number of switching permits C is stored as a function of the engine load Q/N and engine speed N in the form of a map as shown in FIG. 16 in advance in the ROM 22.

Now, as already explained while referring to FIG. 15, in the embodiment according to the present invention, the patterns of combinations of the air-fuel ratios of the cylinders are set so that the numerical values showing the average air-fuel ratio of the first cylinder group 1 increase in stages, that is, the amounts of the heat of oxidation reaction generated increase in stages. In this case, there is a pattern of combination of air-fuel ratios generating the optimum heat of oxidation reaction for making the temperature T of the $NO_x$ storage catalyst 12 the $SO_x$ release target temperature TX shown in FIG. 7. Therefore, in the embodiment according to the present invention, the pattern of combination of air-fuel ratios required for making the temperature T of the $NO_x$ storage catalyst 12 the $SO_x$ release target temperature TX is selected from among these patterns of combinations of air-fuel ratios, and the air-fuel ratios of the cylinders of the cylinder groups 1 and 2 are made air-fuel ratios according to the selected pattern of combination of air-fuel ratios.

Explaining this a bit more specifically, in the embodiment according to the present invention, the settable patterns of combinations of air-fuel ratios are found from the operating state of the engine for one cylinder group, for example, the first cylinder group 1, the average rich degree at the time of these settable combinations of air-fuel ratios is found, the target rich degree required for making the temperature T of the $NO_x$ storage catalyst 12 the $SO_x$ release target temperature TX is found, the pattern of combination of air-fuel ratios giving an average rich degree closest to this target rich degree is selected, and the air-fuel ratios of the cylinders are made the air-fuel ratios of the selected pattern of combination of air-fuel ratios.

Figure 17:
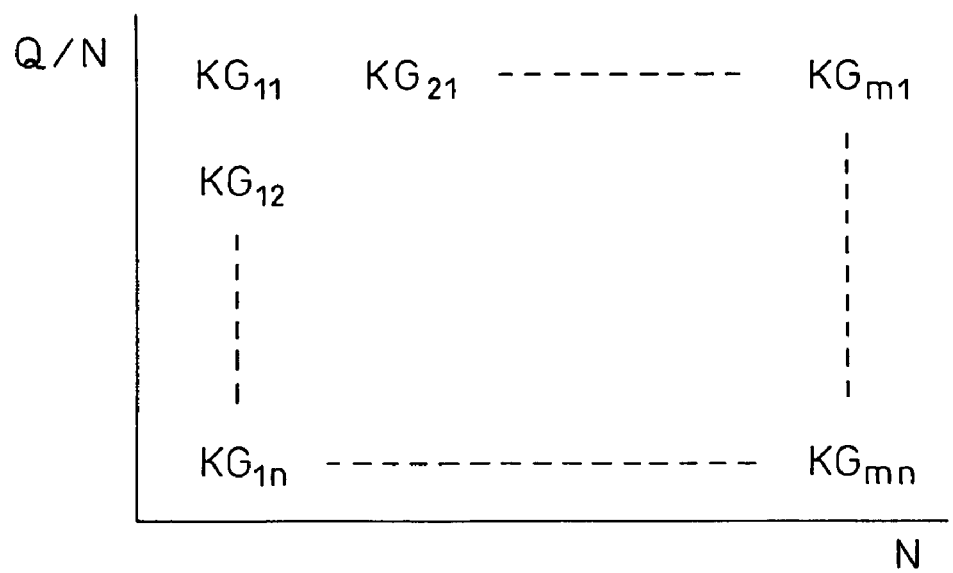
FIG. 17 is a view of a map of an increase coefficient.

Next, this will also be explained in a bit more detail. When the engine is operating in the steady state, the target rich degree of the first cylinder group 1 required for making the temperature T of the $NO_x$ storage catalyst 12 the $SO_x$ release target temperature TX can be found by experiments. In the embodiment according to the present invention, the numerical value showing this rich degree, that is, the increase coefficient KG of the fuel, is stored as a function of the engine load Q/N and engine speed N in the form of the map shown in FIG. 17 in advance in the ROM 22. This increase coefficient KG corresponds to the average value of the first cylinder group shown in FIG. 15. Therefore, if the value of the increase coefficient when the engine is operating in the steady state in a certain operating state of the engine is KGij, if using the pattern of combination of air-fuel ratios whereby the average value of the rich degree of the first cylinder group 1 becomes closest to the value KGij of the increase coefficient as the pattern of combination of air-fuel ratios at this time, the temperature T of the $NO_x$ storage catalyst 12 becomes the temperature closest to the $SO_x$ release target temperature TX.

Note that in this embodiment according to the present invention, even when the temperature T of the $NO_x$ storage catalyst 12 is off from the $SO_x$ release target temperature TX, the rich degree of the first cylinder group 1, that is, the value of the increase coefficient KG, is PI controlled or PID controlled based on the temperature difference between the temperature T of the $NO_x$ storage catalyst 12 and the $SO_x$ release target temperature TX so that the $SO_x$ release target temperature TX is quickly approached. Specifically, the temperature T of the $NO_x$ storage catalyst 12 is estimated from the temperature of the exhaust gas detected by the temperature sensor 14. The target increase coefficient KGO is calculated based on the following formula based on the temperature difference (TX–T) of the estimated temperature T of the $NO_x$ storage catalyst 12 and the $SO_x$ discharge target temperature TX:

$$I \leftarrow I + KI \cdot (TX - T)$$

$$KGO \leftarrow KP \cdot (TX - T) + I + KG$$

Figure 18:
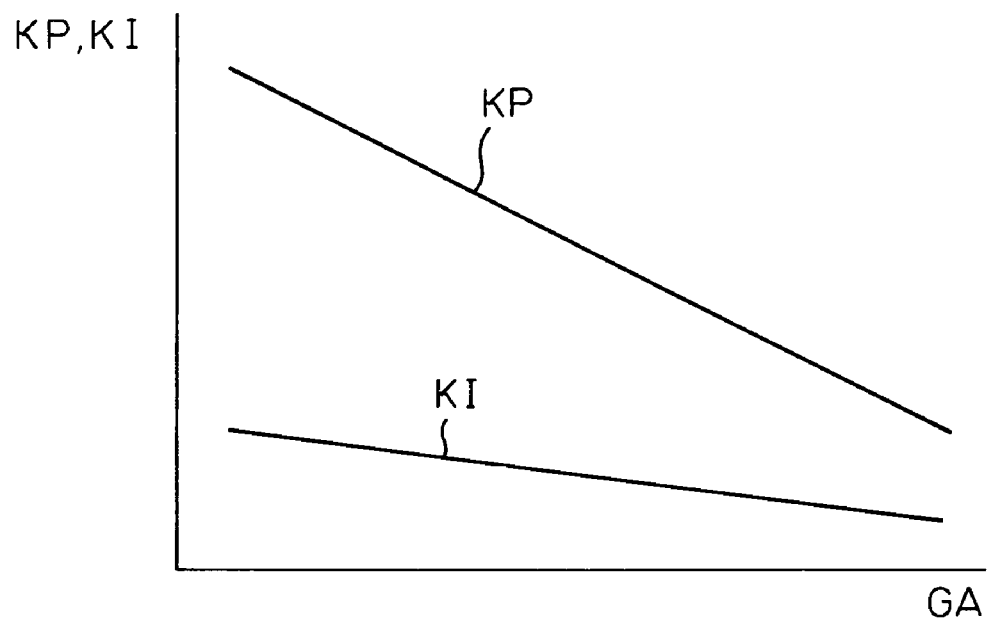
FIG. 18 is a view of a proportional constant KP and integration constant KI.

Here, KI is an integration constant, and KP is a proportional constant. These integration constant KI and proportional constant KP, as shown in FIG. 18, become smaller the larger the exhaust gas amount, that is, intake air amount GA.

When the target increase coefficient KGO is calculated, the pattern of combinations where the average value of the rich degree of the first cylinder group 1 becomes closest to this target increase coefficient KGO is selected from the patterns of combinations of air-fuel ratios, and the air-fuel ratios of the cylinders are made air-fuel ratios in accordance with this selected pattern of combination of air-fuel ratios. By doing this, the temperature T of the $NO_x$ storage catalyst 12 is maintained at the $SO_x$ release target temperature TX.

Figure 19:
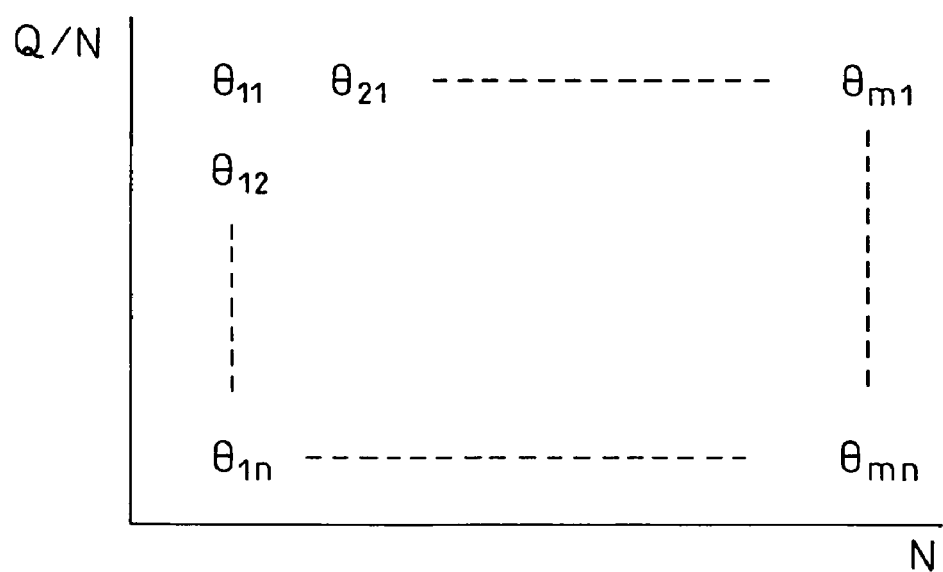
FIG. 19 is a view of a map of a throttle valve opening degree.

However, in this embodiment according to the present invention, at the time of normal operation, all cylinders #1 to #6 are made to burn the fuel under a lean air-fuel ratio or stoichiometric air-fuel ratio. The target opening degree of the throttle valve 8 at the time of combustion is stored as a function of the engine load Q/N and engine speed N in the form of a map in advance in the ROM 22. FIG. 19 shows a map of the target opening degree θ of the throttle valve 8 at the time of combustion under a stoichiometric air-fuel ratio.

Figure 20:
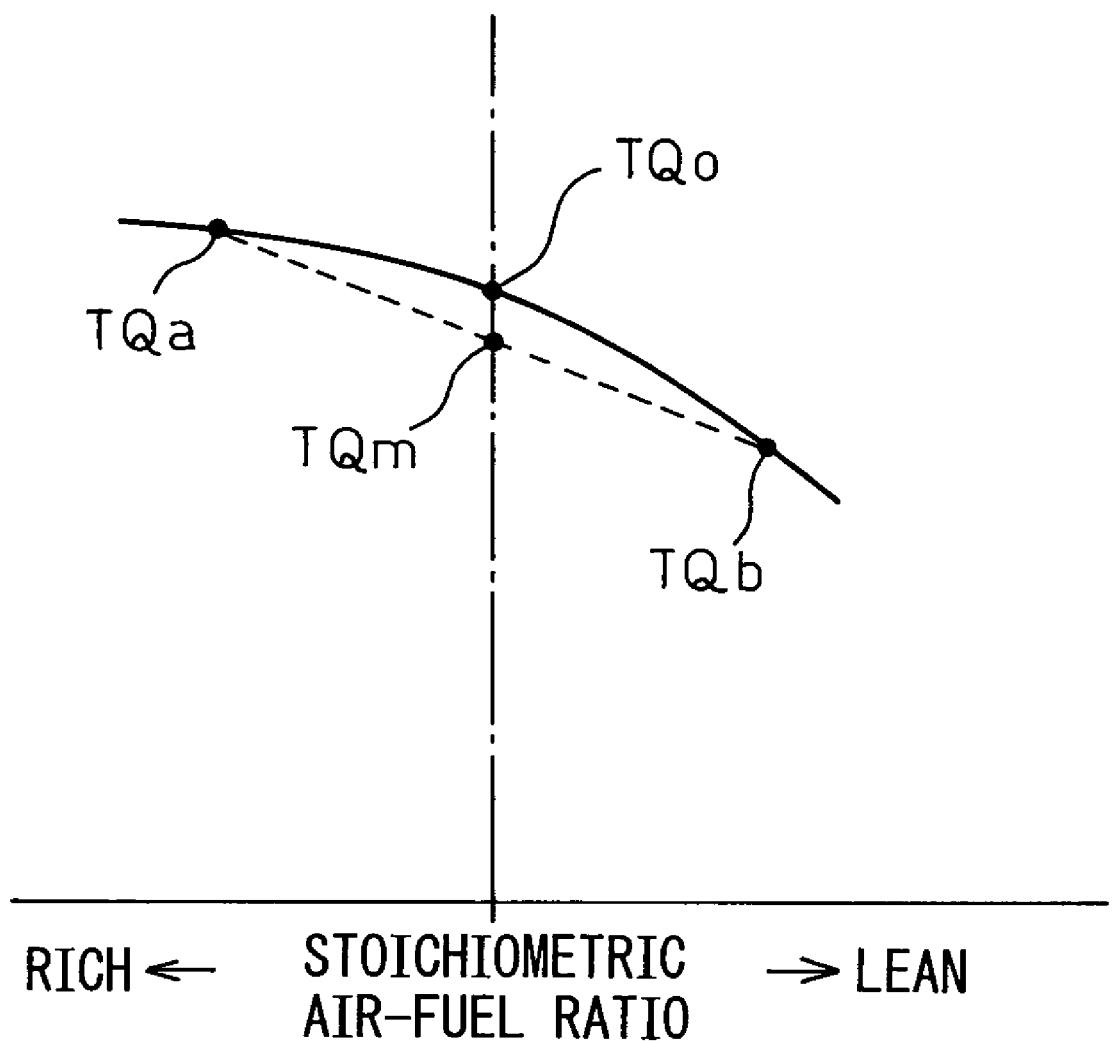
FIG. 20 is a view for explaining a change in engine output torque by the air-fuel ratio.

Now, FIG. 20 shows the output torque $TQ_o$ of each cylinder when combustion is performed under the stoichiometric air-fuel ratio when the engine is operating in a steady state and the output torque $TQ_a$ of each cylinder of the first cylinder group 1 and the output torque $TQ_b$ of each cylinder of the second cylinder group 2 in the state where the sum of the fuel injection amounts to the cylinders is kept the same and the first cylinder group 1 is made rich and the second cylinder group 2 is made lean. As will be understood from FIG. 20, compared with the amount of the increase of the output torque $TQ_a$ when the air-fuel ratio is changed from the stoichiometric air-fuel ratio to rich, the amount of decrease of the output torque $TQ_b$ when the air-fuel ratio is changed from the stoichiometric air-fuel ratio to lean is larger, so the average value $TQ_m$ of these output torques $TQ_a$ and $TQ_b$ becomes smaller than $TQ_o$. That is, from the state where combustion is performed under a stoichiometric air-fuel ratio, if holding the sum of the fuel injection amount to each cylinder the same and simultaneously making the first cylinder group 1 rich and the second cylinder group 2 lean, the output torque will drop.

In this case, in this embodiment according to the present invention, the opening degree of the throttle valve 8 is increased to make up for the drop in the output torque. The amount of increase of the opening degree of the throttle valve 8 for making up for the drop of this output torque is stored as the correction amount for the target opening degree θ shown in FIG. 19.

Specifically, the correction amount ΔθA of the opening degree of the throttle valve 8 in accordance with the operating state of the engine at the time when the air-fuel ratios of all cylinders of the first cylinder group 1 are made the first target air-fuel ratio A in accordance with the operating state of the engine shown in FIG. 9(A) is stored as a function of the engine load Q/N and engine speed N in the form of a map as shown in FIG. 21(A) in advance in the ROM 22, while the correction amount ΔθB of the opening degree of the throttle valve 8 in accordance with the operating state of the engine at the time when the air-fuel ratios of all cylinders of the first cylinder group 1 are made the second target air-fuel ratio B in accordance with the operating state of the engine shown in FIG. 9(B) is stored as a function of the engine load Q/N and engine speed N in the form of a map as shown in FIG. 21(B) in advance in the ROM 22.

In this embodiment according to the present invention, the correction amount of the opening degree of the throttle valve 8 is found by interpolation from the correction amounts ΔθA and ΔθB shown in FIGS. 21(A) and (B) in accordance with the pattern of combination of air-fuel ratios for each cylinder. This will be explained based on the specific example shown in FIG. 22. Note that the abscissa of FIG. 22 shows the rich degree of the first cylinder group 1, that is, the value of the increase coefficient. Referring to FIG. 22, ΔθA shows the correction amount when the rich degree of the first target air-fuel ratio A is 1.1, while ΔθB shows the correction amount when the rich degree of the second target air-fuel ratio B is 1.2. The correction value of the opening degree of the throttle valve 8 at the time of a certain pattern of combination of air-fuel ratios is found by interpolation from the correction amounts ΔθA and ΔθB as shown by the black dots based on the rich degree of the first cylinder group 1 at that time, that is, the value of the increase coefficient.

Figure 23:
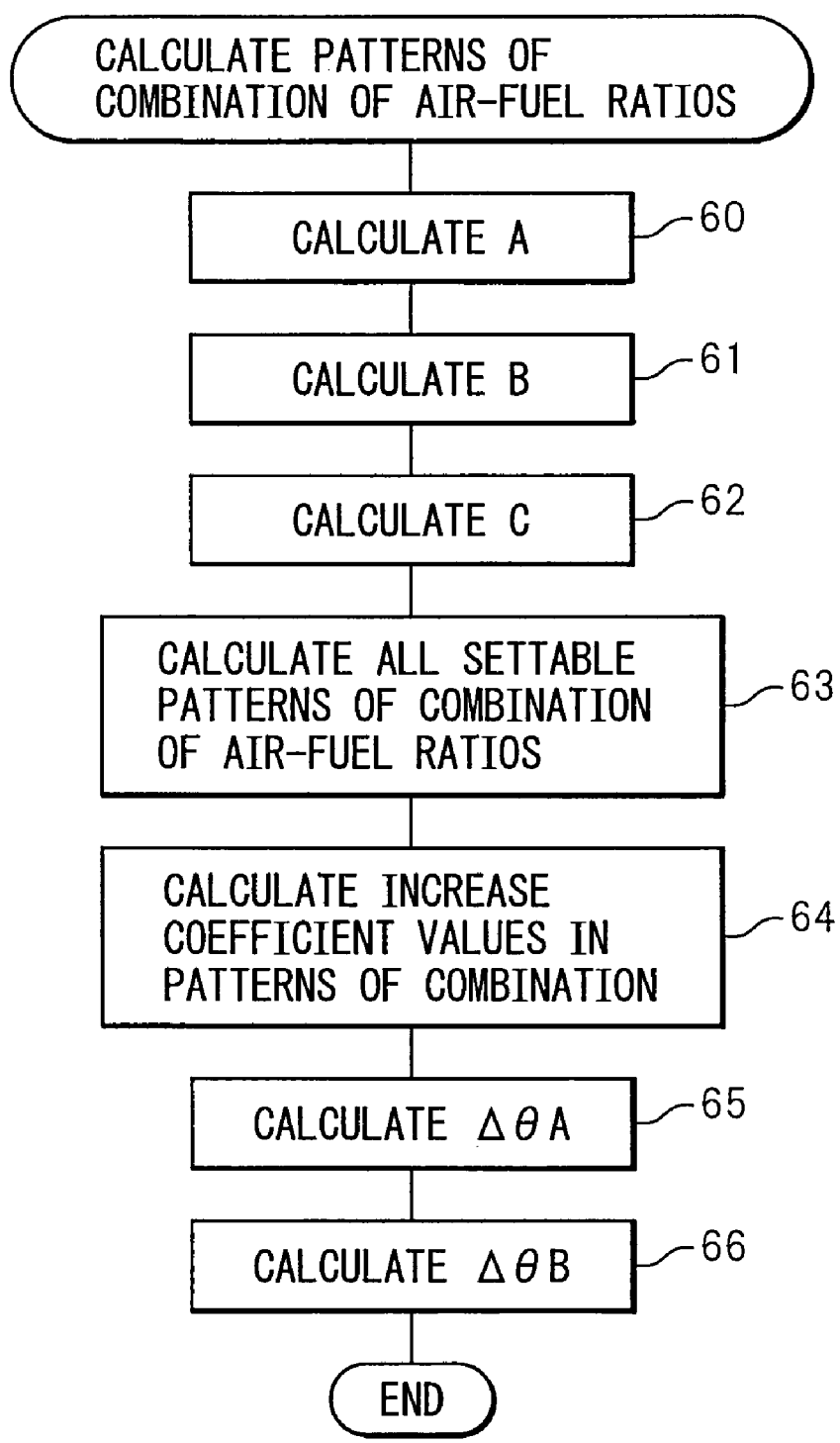
FIG. 23 is a flow chart for calculation of a pattern of combination of air-fuel ratios.

FIG. 23 shows a routine for calculation of a pattern of combination of air-fuel ratios.

Referring to FIG. 23, first, at step 60, the first target air-fuel ratio A in accordance with the operating state of the engine is calculated from the map shown in FIG. 9(A). Next, at step 61, the second target air-fuel ratio B in accordance with the operating state of the engine is calculated from the map shown in FIG. 9(B). Next, at step 62, the number of switching permits C in accordance with the operating state of the engine is calculated from FIG. 16.

Next, at step 63, all of the settable patterns of combinations of air-fuel ratios are calculated from the first target air-fuel ratio A, second target air-fuel ratio B, and number of switching permits C. Next, at step 64, the rich degree of the first cylinder 1 at all of these settable patterns of combinations of air-fuel ratios, that is, the value of the increase coefficient, is calculated. Next, at step 65, the correction value ΔθA of the opening degree of the throttle valve 8 in accordance with the operating state of the engine is calculated from the map shown in FIG. 21(A). Next, at step 66, the correction value ΔθB of the opening degree of the throttle valve 8 in accordance with the operating state of the engine is calculated from the map shown in FIG. 21(B).

Figure 24:
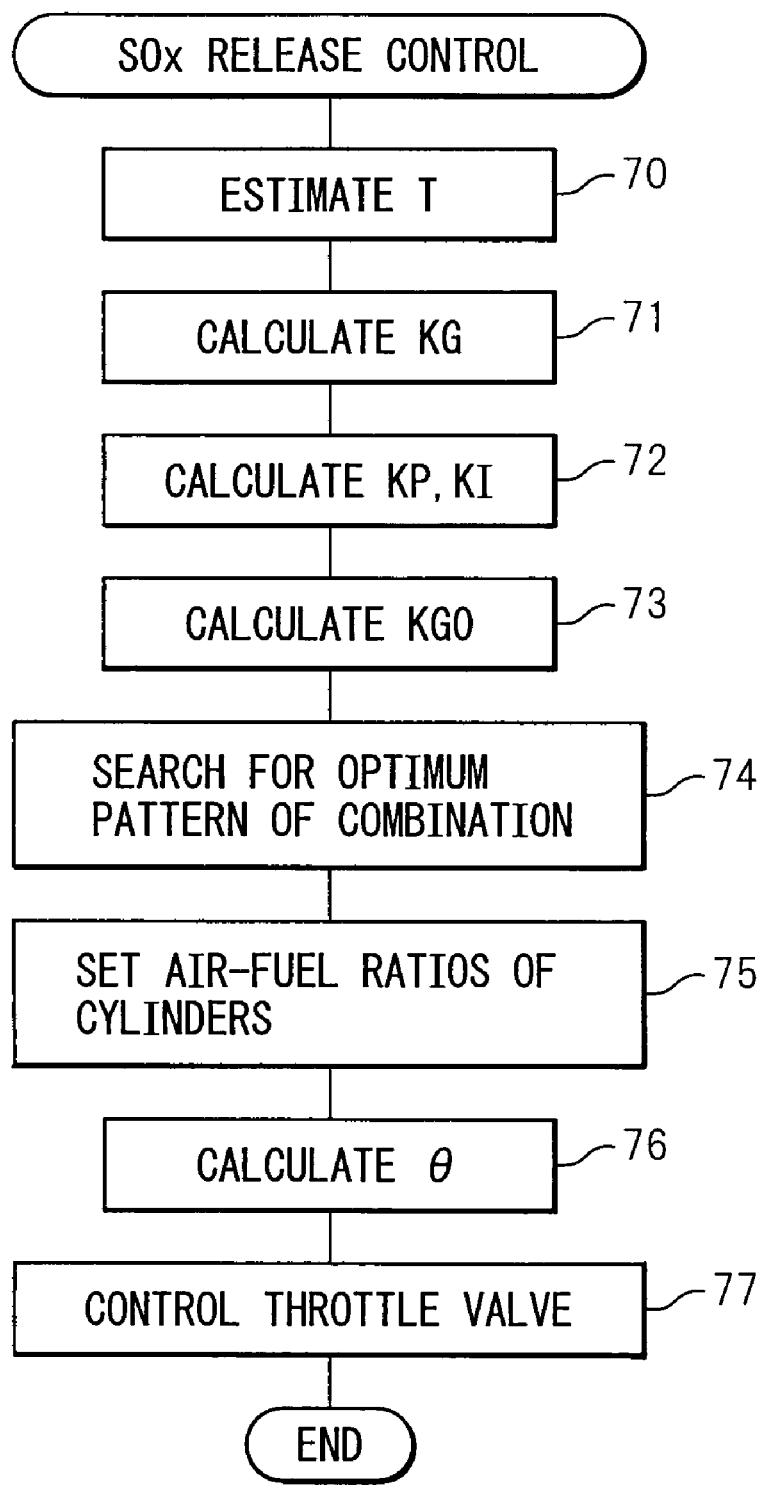
FIG. 24 is a flow chart for execution of $SO_x$ release control.

FIG. 24 shows the $SO_x$ release control routine.

Referring to FIG. 24, first, at step 70, the temperature T of the $NO_x$ storage catalyst 12 is estimated from the output signal of the temperature sensor 14. Next, at step 71, a value of the increase coefficient KG in accordance with the engine operating state is calculated from the map shown in FIG. 17. Next, at step 72, the proportional constant KP and integration constant KI are calculated based on the relationship shown in FIG. 18. Next, at step 73, the target increase coefficient KGO is calculated by PI control from the temperature difference of the $SO_x$ release target temperature TX and the temperature T of the $NO_x$ storage catalyst 12 based on the following equations:

$$I \leftarrow I + KI \cdot (TX - T)$$

$$KGO \leftarrow KP \cdot (TX - T) + I + KG$$

Next, at step 74, the optimum patterns of combinations of air-fuel ratios are found for all cylinders, then the pattern of combination where the increase coefficient becomes closest to the target increase coefficient KGO is selected from all of the settable patterns of combinations of air-fuel ratios calculated. Next, at step 75, the air-fuel ratio of each cylinder is made the air-fuel ratio in accordance with the selected pattern of combinations. Next, at step 76, the opening degree θ of the throttle valve 8 in accordance with the engine operating state is calculated from the map shown in FIG. 19. Next, at step 77, the correction amount found by interpolation from the correction values ΔθA, ΔθB shown in FIGS. 21(A) and (B) is added to the opening degree θ of the throttle valve 8, and the opening degree of the throttle valve 8 is controlled to the opening degree increased by this correction amount.

LIST OF REFERENCE NUMERALS

1 first cylinder group
2 second cylinder group
3 cylinder
9*a* first exhaust manifold
9*b* second exhaust manifold
10*a*, 10*b* three-way catalyst
12 $NO_x$ storage catalyst

The invention claimed is:

1. An exhaust purification apparatus of an internal combustion engine, comprising:
an internal combustion engine comprising a plurality of cylinders, an exhaust passage connected to the cylinders and a common catalyst in the exhaust passage;
in which cylinders are divided into a pair of cylinder groups, exhaust gas exhausted from each cylinder group is exhausted to a common catalyst, and, when said catalyst should be held in a raised temperature state, an average air-fuel ratio of one cylinder group is made rich and an average air-fuel ratio of other cylinder group is made lean so that an air-fuel ratio of the exhaust gas flowing into said catalyst becomes the substantially stoichiometric air-fuel ratio, wherein at least two different target air-fuel ratios are preset for each operating state of the engine for the air-fuel ratio of each cylinder of said one cylinder group when the average air-fuel ratio is to be made rich, at least two different target air-fuel ratios are preset for each operating state of the engine for the air-fuel ratio of each cylinder of said other cylinder group when the average air-fuel ratio is to be made lean, and the air-fuel ratio of each cylinder of said one cylinder group is made a target air-fuel ratio selected from the corresponding at least two said target air-fuel ratios corresponding to the operating state of the engine and differing among at least part of the cylinders and the air-fuel ratio of each cylinder of said other cylinder group is made a target air-fuel ratio selected from the corresponding at least two said target air-fuel ratios corresponding to the operating state of the engine and differing among at least part of the cylinders so that the temperature of said catalyst is made to become a predetermined target temperature.

2. An exhaust purification apparatus of internal combustion engine as set forth in claim 1, wherein when the air-fuel ratio of each cylinder of each cylinder group is made a target air-fuel ratio selected from the corresponding at least two target air-fuel ratios corresponding to the operating state of the engine, there is a case where the same target air-fuel ratio is used for all cylinders of each cylinder group.

3. An exhaust purification apparatus of internal combustion engine as set forth in claim 1, wherein the at least two target air-fuel ratios preset in accordance with the operating state of the engine for the air-fuel ratio of each cylinder of said one cylinder group are a stoichiometric air-fuel ratio or rich air-fuel ratio, while the at least two target air-fuel ratios preset in accordance with the operating state of the engine for the air-fuel ratio of each cylinder of said other cylinder group are a stoichiometric air-fuel ratio or lean air-fuel ratio.

4. An exhaust purification apparatus of internal combustion engine as set forth in claim 1, wherein the at least two target air-fuel ratios preset corresponding to the operating states of the engine for the air-fuel ratio of each cylinder of said one cylinder group are comprised of a first target rich air-fuel ratio and a second target rich air-fuel ratio with a rich degree higher than said first target rich air-fuel ratio, the at least two target air-fuel ratios preset corresponding to the operating states of the engine for the air-fuel ratio of each cylinder of said other cylinder group are comprised of a first target lean air-fuel ratio and a second target lean air-fuel ratio with a lean degree higher than said first target lean air-fuel ratio, an average value of the first target rich air-fuel ratio and first target lean air-fuel ratio is the stoichiometric air-fuel ratio, and an average value of the second target rich air-fuel ratio and second target lean air-fuel ratio is the stoichiometric air-fuel ratio.

5. An exhaust purification apparatus of internal combustion engine as set forth in claim 4, wherein the first target rich air-fuel ratio and first target lean air-fuel ratio in each operating state of the engine are air-fuel ratios where the convergence temperature of said catalyst when operated in the steady state in that operating state becomes said target temperature or a temperature just slightly lower than said target temperature and wherein the second target rich air-fuel ratio and second target lean air-fuel ratio at each operating state of the engine are the minimum rich air-fuel ratio or maximum lean air-fuel ratio allowed in each operating state.

6. An exhaust purification apparatus of internal combustion engine as set forth in claim 4, wherein patterns of combinations of air-fuel ratios are found for all cylinders in the case where the air-fuel ratio of each cylinder of the one cylinder group is made either of the first target rich air-fuel ratio and the second target rich air-fuel ratio in accordance with the operating state of the engine, patterns of combinations of air-fuel ratios are found for all cylinders in the case where the air-fuel ratio of each cylinder of the other cylinder group is made either of the first target lean air-fuel ratio and the second target lean air-fuel ratio in accordance with the operating state of the engine, a pattern of combination of air-fuel ratios required for making the temperature of said catalyst a predetermined target temperature is selected from these patterns of combinations of air-fuel ratios, and the air-fuel ratio of each cylinder of each cylinder group is made an air-fuel ratio in accordance with the selected pattern of combination of air-fuel ratios.

7. An exhaust purification apparatus of internal combustion engine as set forth in claim 6, wherein the number of cylinders of said one cylinder group made said first target rich air-fuel ratio and the number of cylinders of said other cylinder group made said first target lean air-fuel ratio are made equal and wherein the number of cylinders of said other cylinder group made said second target rich air-fuel ratio and the number of cylinders of said other cylinder group made said second target lean air-fuel ratio are made equal.

8. An exhaust purification apparatus of internal combustion engine as set forth in claim 6, wherein, in accordance with said pattern of combination of air-fuel ratios, combustion at the first target rich air-fuel ratio in the one cylinder group and combustion at the first target lean air-fuel ratio in the other cylinder group are successively performed, combustion at the second target rich air-fuel ratio in the one cylinder group and combustion at the second target lean air-fuel ratio in the other cylinder group are successively performed, a frequency of a consecutively performed first set of combustion operations comprising combustion at a first target rich air-fuel ratio and combustion at a first target lean air-fuel ratio and a frequency of a consecutively performed second set of combustion operations comprising a second target rich air-fuel ratio and combustion at a second target lean air-fuel ratio are changed in accordance with an operating state of the engine.

9. An exhaust purification apparatus of internal combustion engine as set forth in claim 8, wherein each time the first set of combustion operations is performed 1 time, 2 times . . . and C times (C is a positive integer), permission is given for switching to the second set of combustion operations, each time the second set of combustion operations is performed 1 time, 2 times . . . C times, permission is given for switching to the first set of combustion operations, and the number of said C is made smaller the lower the engine speed.

10. An exhaust purification apparatus of internal combustion engine as set forth in claim 6, wherein patterns of combinations of air-fuel ratios able to be set from the operating state of the engine are found for said one cylinder group, the average rich degree when combining the settable air-fuel ratios is found, the target rich degree required for making the temperature of said catalyst a predetermined target temperature is found, the pattern of combination of air-fuel ratios giving the average rich degree closest to the target rich degree is selected, and the air-fuel ratio of each cylinder is made the air-fuel ratio in accordance with the selected pattern of combination of air-fuel ratios.

11. An exhaust purification apparatus of internal combustion engine as set forth in claim 10, wherein a temperature of said catalyst is estimated and a target rich degree is found based on the temperature difference between the estimated catalyst temperature and said target temperature.

12. An exhaust purification apparatus of internal combustion engine as set forth in claim 6, wherein the correction amount of the throttle valve opening degree for making up for the drop in output of the engine when the average air-fuel ratio of one cylinder group is made rich and the average air-fuel ratio of the other cylinder group is made lean is stored for each case of making the air-fuel ratio the target air-fuel ratio and wherein the correction amount of the throttle valve opening degree is calculated from said stored correction amount in accordance with the set pattern of combination of air-fuel ratios.

13. An exhaust purification apparatus of internal combustion engine as set forth in claim 1, wherein said catalyst is comprised of a $NO_x$ storage catalyst storing $NO_x$ contained in exhaust gas when the air-fuel ratio of the inflowing exhaust gas is lean and releasing the stored $NO_x$ when the air-fuel ratio of the inflowing exhaust gas becomes the stoichiometric air-fuel ratio or rich.

* * * * *